(12) United States Patent
Ikeda et al.

(10) Patent No.: US 9,806,357 B2
(45) Date of Patent: Oct. 31, 2017

(54) FUEL CELL SYSTEM

(71) Applicant: NISSAN MOTOR CO., LTD., Yokohama-shi, Kanagawa (JP)

(72) Inventors: Nobuhisa Ikeda, Kanagawa (JP); Hayato Chikugo, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/035,580

(22) PCT Filed: Sep. 25, 2014

(86) PCT No.: PCT/JP2014/075490
§ 371 (c)(1),
(2) Date: May 10, 2016

(87) PCT Pub. No.: WO2015/072229
PCT Pub. Date: May 21, 2015

(65) Prior Publication Data
US 2016/0276681 A1    Sep. 22, 2016

(30) Foreign Application Priority Data

Nov. 14, 2013  (JP) .................................. 2013-236291

(51) Int. Cl.
*H01M 8/04* (2016.01)
*H01M 8/04089* (2016.01)
(Continued)

(52) U.S. Cl.
CPC ....... *H01M 8/04104* (2013.01); *H01M 8/043* (2016.02); *H01M 8/04225* (2016.02);
(Continued)

(58) Field of Classification Search
CPC ......... H01M 8/04104; H01M 8/04225; H01M 8/04228; H01M 8/043; H01M 8/04231;
(Continued)

(56) References Cited

U.S. PATENT DOCUMENTS 8,415,063 B2    4/2013  Orihashi et al.
2009/0035630 A1  2/2009  Kumada et al.
(Continued)

FOREIGN PATENT DOCUMENTS

CN    101897068 A    11/2010
JP    2009-037770 A    2/2009
(Continued)

*Primary Examiner* — Raymond Alejandro
(74) *Attorney, Agent, or Firm* — Foley & Lardner LLP

(57) ABSTRACT

A fuel cell system includes: a cathode pressure control unit configured to control a pressure of a cathode gas to be supplied to the fuel cell stack on the basis of a load of the fuel cell stack; and an anode pressure control unit configured to control a pressure of an anode gas to be supplied to the fuel cell stack to become higher than the pressure of the cathode gas so that a differential pressure between the pressure of the anode gas and the pressure of the cathode gas becomes a predetermined differential pressure or lower. The anode pressure control unit controls, at a time of recovery from idle stop, the pressure of the anode gas to be supplied to the fuel cell stack to a recovery-time pressure, the recovery-time pressure being obtained by adding the predetermined differential pressure to a predetermined pressure corresponding to an atmosphere pressure.

9 Claims, 15 Drawing Sheets

(51) Int. Cl.

| | |
|---|---|
| *H01M 8/0438* | (2016.01) |
| *H01M 8/04537* | (2016.01) |
| *H01M 8/04746* | (2016.01) |
| *H01M 8/043* | (2016.01) |
| *H01M 8/04223* | (2016.01) |
| *H01M 8/04228* | (2016.01) |
| *H01M 8/04225* | (2016.01) |
| *H01M 8/1018* | (2016.01) |

(52) U.S. Cl.
CPC ... *H01M 8/04228* (2016.02); *H01M 8/04231* (2013.01); *H01M 8/04395* (2013.01); *H01M 8/04619* (2013.01); *H01M 8/04753* (2013.01); *H01M 8/04783* (2013.01); *H01M 8/1018* (2013.01); *H01M 2250/20* (2013.01); *Y02E 60/521* (2013.01); *Y02T 90/32* (2013.01)

(58) Field of Classification Search
CPC ......... H01M 8/04395; H01M 8/04619; H01M 8/04753; H01M 8/04783; H01M 8/1018; H01M 2250/20; Y02E 60/521
See application file for complete search history.

(56) References Cited

U.S. PATENT DOCUMENTS

| | | | |
|---|---|---|---|
| 2009/0169927 A1 | 7/2009 | Sato et al. | |
| 2010/0266915 A1 | 10/2010 | Orihashi et al. | |
| 2012/0301804 A1* | 11/2012 | Wake | H01M 8/04 429/429 |
| 2013/0209906 A1* | 8/2013 | Harris | H01M 8/04089 429/429 |
| 2013/0224615 A1* | 8/2013 | Makino | H01M 8/04223 429/429 |

FOREIGN PATENT DOCUMENTS

| | | |
|---|---|---|
| JP | 2010-277837 A | 12/2010 |
| JP | 2012-134166 A | 7/2012 |

* cited by examiner

FUEL CELL SYSTEM

TECHNICAL FIELD

The present invention relates to a fuel cell system.

BACKGROUND ART

JP2012-134166A discloses, as a conventional fuel cell system, one provided with an idle stop function in which electric power generation by a fuel cell is temporarily stopped at the time of a low load operation or the like, and a fuel cell system is operated by means of an electric power of a secondary battery.

SUMMARY OF THE INVENTION

In order to suppress mechanical strength of an electrolyte membrane from being deteriorated, during electric power generation by the fuel cell, a pressure of each of reaction gases to be supplied to a corresponding electrode is controlled in accordance with a load of the fuel cell so that a differential pressure between an anode side and a cathode side in the fuel cell (hereinafter, referred to as a "inter-membrane differential pressure") reaches a predetermined allowable inter-membrane differential pressure or higher.

Here, at the time of boot of electric power generation by the fuel cell, such as at the time of start of the fuel cell system and at the time of recovery from idle stop (hereinafter, referred to as a "IS recovery time"), it is normally in a state that an air is mixed in an anode gas flow passage within the fuel cell as an impurity. For that reason, at the time of the start of the electric power generation by the fuel cell, it is needed to discharge the air within the anode gas flow passage from an active area of the fuel cell (electric power generation area).

Therefore, at the time of the boot, the inter-membrane differential pressure is allowed to become the allowable inter-membrane differential pressure or higher, and a supply pressure of an anode gas is controlled to the maximum pressure, for example, to become as high as possible. This makes it possible to discharge all the air within the anode gas flow passage from the active area quickly and to displace it by the anode gas.

On the other hand, in a case where the inter-membrane differential pressure is also allowed to become the allowable inter-membrane differential pressure or higher at the time of IS recovery, it is concerned that mechanical strength of an electrolyte membrane is deteriorated. There is a fear that durability performance of the fuel cell to be required cannot be ensured because frequency of the IS recovery is larger compared with that of the boot.

For that reason, it may be thought that at the time of the IS recovery, the supply pressure of the anode gas is set to be as high as possible within a range that the inter-membrane differential pressure does not exceed the allowable inter-membrane differential pressure on the basis of a pressure of a cathode gas that varies in accordance with a load of the fuel cell, for example.

However, this causes the supply pressure of the anode gas at the time of the IS recovery to become lowered basically compared with that at the time of the boot. For this reason, there is a possibility that the air within the anode gas flow passage cannot be displaced by the anode gas completely.

In such a case, it is necessary to gradually discharge the air remaining within the anode gas flow passage to an anode gas discharge passage by purging an anode-off gas. However, the load of the fuel cell is lowered during purge and the supply pressure of the anode gas is thus lowered together with lowering of a supply pressure of the cathode gas, there is a fear that the air discharged to the anode gas discharge passage flows backward to the inside of the active area again.

Thus, in a case where the air that is temporarily discharged flows backward to the active area again in a state where the air remains within the anode gas flow passage, occurrence of starvation is promoted particularly downstream of the active area.

The present invention was made by focusing such problems, and it is an object of the present invention to provide a fuel cell system capable of suppressing starvation from occurring at the time of return from an IS while suppressing mechanical strength of an electrolyte membrane from being deteriorated.

According to an aspect of the present invention, there is provided a fuel cell system with an idle stop function in which electric power generation by a fuel cell can be stopped temporarily. This fuel cell system includes: a cathode pressure control unit configured to control a pressure of a cathode gas to be supplied to the fuel cell on the basis of a load of the fuel cell; and an anode pressure control unit configured to control a pressure of an anode gas to be supplied to the fuel cell to become higher than the pressure of the cathode gas so that a differential pressure between the pressure of the anode gas and the pressure of the cathode gas becomes a predetermined differential pressure or lower. In this case, the anode pressure control unit controls, at a time of recovery from idle stop, the pressure of the anode gas to be supplied to the fuel cell to a recovery-time pressure, the recovery-time pressure being obtained by adding the predetermined differential pressure to a predetermined pressure corresponding to an atmosphere pressure.

DESCRIPTION OF THE EMBODIMENTS

Hereinafter, one embodiment of the present invention will be described with reference to the accompanying drawings.

In a fuel cell, an electrolyte membrane is sandwiched between an anode electrode (fuel electrode) and a cathode electrode (oxidant electrode), and electric power is generated by supplying an anode gas (fuel gas) containing hydrogen to the anode electrode and supplying a cathode gas (oxidant gas) containing oxygen to the cathode electrode. Electrode reactions that proceed on both the anode electrode and the cathode electrode are as follows.

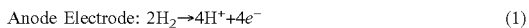

Anode Electrode: $2H_2 \rightarrow 4H^+ + 4e^-$ (1)

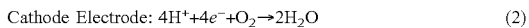

Cathode Electrode: $4H^+ + 4e^- + O_2 \rightarrow 2H_2O$ (2)

The fuel cell generates an electromotive force of about one volt by means of these electrode reactions (1) and (2).

Figure 1:
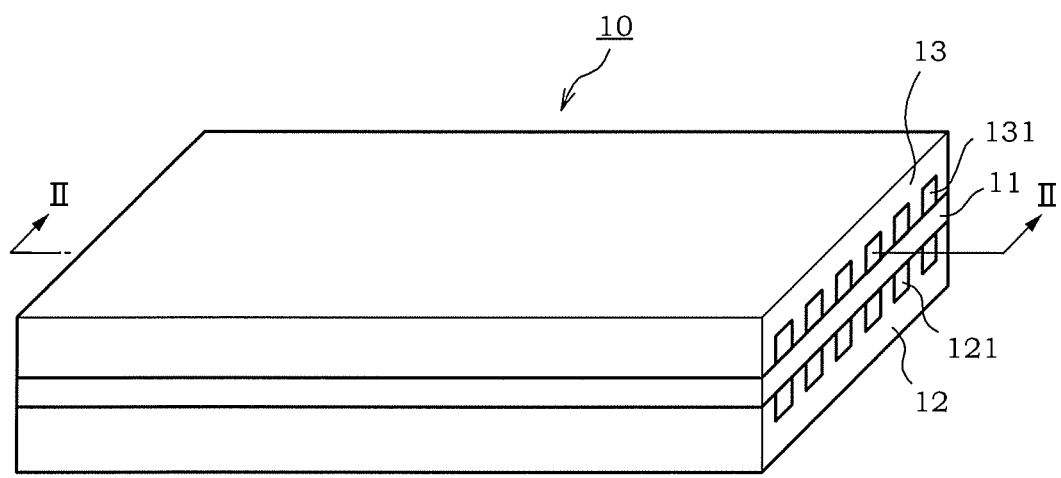
FIG. 1 is a view for explaining a configuration of a fuel cell according to one embodiment of the present invention.
Figure 2:
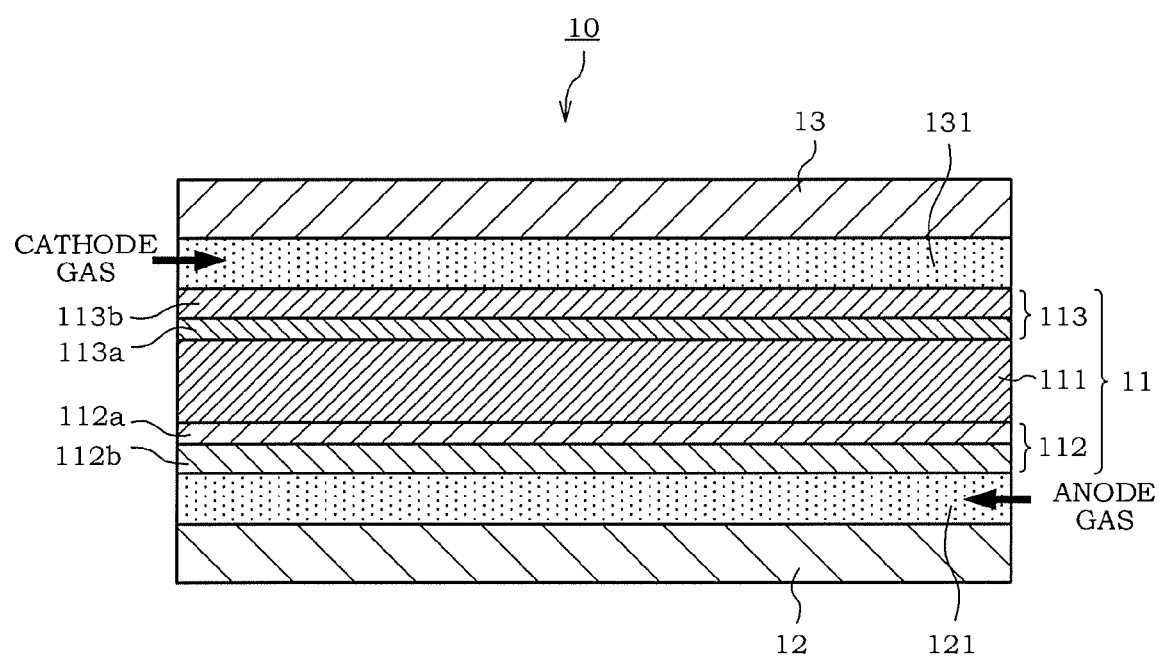
FIG. 2 is a sectional view of the fuel cell in FIG. 1 taken along II-II.

FIG. 1 and FIG. 2 are views explaining a configuration of a fuel cell 10 according to one embodiment of the present invention. FIG. 1 is a schematic perspective view of the fuel cell 10. FIG. 2 is a cross-sectional view of the fuel cell 10 in FIG. 1 taken along II-II.

The fuel cell 10 is configured by arranging an anode separator 12 and a cathode separator 13 on both front and back surfaces of an MEA 11.

The MEA 11 includes an electrolyte membrane 111, an anode electrode 112, and a cathode electrode 113. The MEA 11 has the anode electrode 112 and the cathode electrode 113 on one surface and the other surface of the electrolyte membrane 111, respectively. In the following explanation, an area in the MEA 11 where the anode gas and the cathode gas are supplied and the electrode reactions mentioned above occur is referred to as an "active area" as necessary.

The electrolyte membrane 111 is a proton conductive ion exchange membrane formed of fluorine-based resin. The electrolyte membrane 111 exhibits good electrical conductivity in a wet state.

The anode electrode 112 includes a catalyst layer 112a and a gas diffusion layer 112b. The catalyst layer 112a is in contact with the electrolyte membrane 111. The catalyst layer 112a is formed of platinum or carbon black particles supporting platinum or the like. The gas diffusion layer 112b is provided on an outer side (a side opposite to the electrolyte membrane 111) of the catalyst layer 112a, and is in contact with the anode separator 12. The gas diffusion layer 112b is formed of a member having a sufficient gas diffusion characteristic and elect' is conductivity. The gas diffusion layer 112b is formed of a carbon cloth formed by weaving fibers made of a carbon fiber, for example.

The cathode electrode 113 also includes a catalyst layer 113a and a gas diffusion layer 113b as well as the anode electrode 112.

The anode separator 12 is in contact with the gas diffusion layer 112b. The anode separator 12 includes a plurality of groove-like anode gas flow passages 121 for supplying the anode gas to the anode electrode 112.

The cathode separator 13 is in contact with the gas diffusion layer 113b. The cathode separator 13 includes a plurality of groove-like cathode gas flow passages 131 for supplying the cathode gas to the cathode electrode 113.

The anode gas flowing through the anode gas flow passages 121 and the cathode gas flowing the cathode gas flow passages 131 flow in parallel with each other in directions opposite to each other. It may be configured so that they flow in parallel with each other in the same direction.

In a case where such a fuel cell 10 is utilized as a power source for a vehicle, the electric power to be required becomes greater. For this reason, the fuel cells 10 are used as a fuel cell stack 1 in which several hundreds of the fuel cells 10 are laminated. Then, by constituting a fuel cell system 100 for supplying the anode gas and the cathode gas to the fuel cell stack 1, an electric power for driving the vehicle is taken out.

Figure 3:
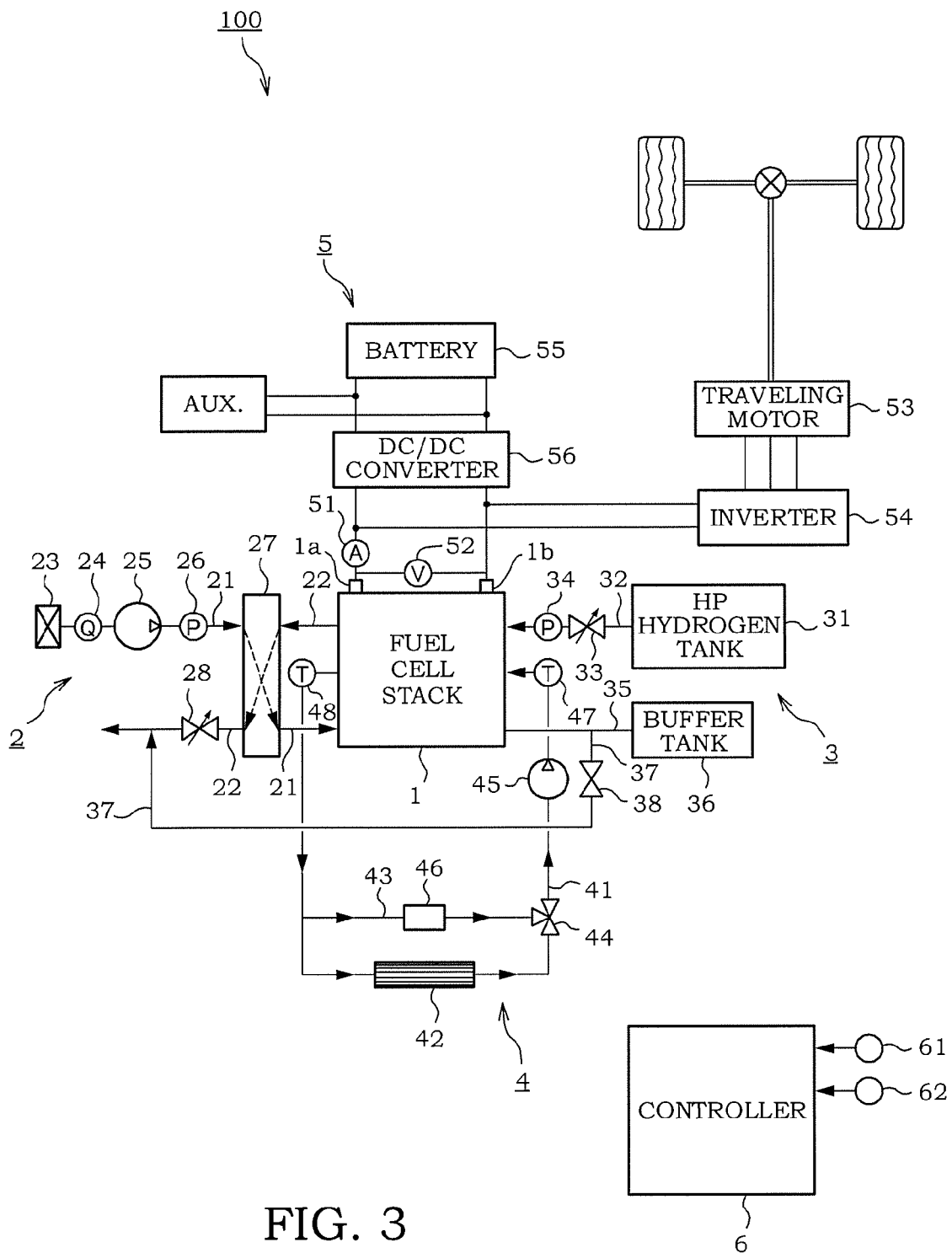
FIG. 3 is a schematic view of a fuel cell system according to one embodiment of the present invention.

FIG. 3 is a schematic view of a fuel cell system 100 according to one embodiment of the present invention.

The fuel cell system 100 includes the fuel cell stack 1, a cathode gas supply/discharge device 2, an anode gas supply/discharge device 3, a stack cooling device 4, a power generating system 5, and a controller 6.

The fuel cell stack 1 is constructed by stacking a plurality of fuel cells 10, and receives the supply of the anode gas and the cathode gas to generate an electric power necessary for driving of the vehicle. The fuel cell stack 1 includes an anode electrode-side output terminal 1a and a cathode electrode-side output terminal 1b as terminals for extracting an electric power.

The cathode gas supply/discharge device 2 includes a cathode gas supply passage 21, a cathode gas discharge passage 22, a filter 23, an air flow sensor 24, a cathode compressor 25, a cathode pressure sensor 26, a water recovery device (Water Recovery Device: hereinafter, referred to as a "WRD") 27, and a cathode pressure regulating valve 28. The cathode gas supply/discharge device 2 supplies the cathode gas to the fuel cell stack 1, and discharges a cathode off-gas discharged from the fuel cell stack 1 to the outside air.

The cathode gas supply passage 21 is a passage in which the cathode gas to be supplied to the fuel cell stack 1 flows. One end of the cathode gas supply passage 21 is connected to the filter 23, and the other end thereof is connected to a cathode gas inlet port of the fuel cell stack 1.

The cathode gas discharge passage 22 is a passage in which the cathode off-gas discharged from the fuel cell stack 1 flows. One end of the cathode gas discharge passage 22 is connected to a cathode gas outlet port of the fuel cell stack 1, and the other end thereof becomes an open end. The cathode off-gas is a mixture gas of the cathode gas and steam generated by the electrode reactions.

The filter 23 removes foreign matter in the cathode gas to be taken in the cathode gas supply passage 21.

The air flow sensor 24 is provided on the cathode gas supply passage 21 upstream from the cathode compressor 25. The air flow sensor 24 detects a flow rate of the cathode gas that is supplied to the cathode compressor 25 and is then supplied to the fuel cell stack 1 finally.

The cathode compressor 25 is provided on the cathode gas supply passage 21. The cathode compressor 25 takes air (outside air) in the cathode gas supply passage 21 as the cathode gas via the filter 23, and supplies the air to the fuel cell stack 1.

The cathode pressure sensor 26 is provided on the cathode gas supply passage 21 between the cathode compressor 25 and the WRD 27. The cathode pressure sensor 26 detects a pressure of the cathode gas in the vicinity of a cathode gas inlet port of the WRD 27 (hereinafter, referred to as a "cathode pressure"). Hereinafter, a detected value of this cathode pressure sensor 26 is referred to as a "detected cathode pressure". In the present embodiment, this detected cathode pressure is substituted as a pressure within the cathode gas flow passages 131 that face the active area.

The WRD 27 is connected to each of the cathode gas supply passage 21 and the cathode gas discharge passage 22 to collect moisture in the cathode off-gas flowing in the cathode gas discharge passage 22. The WRD 27 humidifies the cathode gas flowing in the cathode gas supply passage 21 using the collected moisture.

The cathode regulating valve 28 is provided on the cathode gas discharge passage 22 downward from the WRD 27. Opening and closing of the cathode regulating valve 28 is controlled by the controller 6 to adjust the pressure of the cathode gas to be supplied to the fuel cell stack 1 to a desired pressure. In this regard, a throttle such as an orifice or the like may be provided without providing the cathode pressure regulating valve 28.

The anode gas supply/discharge device 3 supplies the anode gas to the fuel cell stack 1, and discharges an anode off-gas discharged from the fuel cell stack 1 to the cathode gas discharge passage 22. The anode gas supply/discharge device 3 includes a high-pressure tank 31, an anode gas supply passage 32, an anode pressure regulating valve 33, an anode pressure sensor 34, an anode gas discharge passage 35, a buffer tank 36, a purge passage 37, and a purge valve 38.

The high-pressure tank 31 keeps and stores the anode gas to be supplied to the fuel cell stack 1 in a high-pressure state.

The anode gas supply passage 32 is a passage to supply the anode gas discharged from the high-pressure tank 31 to the fuel cell stack 1. One end of the anode gas supply passage 32 is connected to the high-pressure tank 31, and the other end thereof is connected to an anode gas inlet port of the fuel cell stack 1.

The anode pressure regulating valve 33 is provided on the anode gas supply passage 32. Opening and closing of the anode pressure regulating valve 33 is controlled by the controller 6 to adjust a pressure of the anode gas to be supplied to the fuel cell stack 1 to a desired pressure.

The anode pressure sensor 34 is provided on the anode gas supply passage 32 downward from the anode pressure regulating valve 33 to detect a pressure of the anode gas to be supplied to the fuel cell stack 1 (hereinafter, referred to as a "anode pressure"). Hereinafter, a detected value of this anode pressure sensor 34 is referred to as a "detected anode pressure". In the present embodiment, this detected anode pressure is substituted as a pressure within the anode gas flow passages 121 that face the active area.

One end of the anode gas discharge passage 35 is connected to an anode gas outlet port of the fuel cell stack 1, and the other end thereof is connected to the buffer tank 36. A mixed gas of the excessive anode gas that was not used by the electrode reaction, and impurities such as nitrogen and moisture (containing generated water and water vapor) that permeated from a cathode electrode side to an anode electrode side (hereinafter, referred to as a "anode-off gas") is discharged to the anode gas discharge passage 35.

The buffer tank 36 temporarily stores the anode-off gas that has flowed through the anode gas discharge passage 35. The anode-off gas stored in the buffer tank 36 is discharged to the cathode gas discharge passage 22 through the purge passage 37 when the purge valve 38 is opened.

One end of the purge passage 37 is connected to the anode gas discharge passage 35, and the other end thereof is connected to the cathode gas discharge passage 22.

The purge valve 38 is provided on the purge passage 37. Opening and closing of the purge valve 38 is controlled by the controller 6 to control a flow rate of the anode-off gas discharged from the anode gas discharge passage 35 to the cathode gas discharge passage 22 (hereinafter, referred to as a "purge flow rate"). In the following explanation, discharging the anode-off gas to the cathode gas discharge passage 22 by opening the purge valve 38 is referred to as "purge" if necessary.

The anode off-gas discharged to the cathode gas discharge passage 22 via the anode gas discharge passage 35 is mixed with the cathode off-gas in the cathode gas discharge passage 22, and is discharged to the outside of the fuel cell system 100. Excess hydrogen that is not used in the electrode reaction is contained in the anode off-gas. Therefore, by mixing the excess hydrogen with the cathode off-gas and then discharging it to the outside of the fuel cell system 100, a hydrogen concentration in the discharge gas is set to become a predetermined concentration or lower.

The stack cooling device 4 is a device that cools the fuel cell stack 1 and keeps a temperature of the fuel cell stack 1 suitable for electric power generation. The stack cooling device 4 includes a cooling water circulating passage 41, a radiator 42, a bypass passage 43, a three-way valve 44, a circulation pump 45, a PTC heater 46, an inlet water temperature sensor 47, and an outlet water temperature sensor 48.

The cooling water circulating passage 41 is a passage through which a cooling water for cooling the fuel cell stack 1 circulates. One end of the cooling water circulating passage 41 is connected to a cooling water inlet port of the fuel cell stack 1, and the other end thereof is connected to a cooling water outlet port of the fuel cell stack 1.

The radiator 42 is provided on the cooling water circulating passage 41. The radiator 42 cools the cooling water discharged from the fuel cell stack 1.

One end of the bypass passage 43 is connected to the cooling water circulating passage 41, and the other end is connected to the three-way valve 44 so that the cooling water is allowed to bypass the radiator 42 to circulate.

The three-way valve 44 is provided on the cooling water circulating passage 41 at a downstream side of the radiator 42. The three-way valve 44 switches between circulation routes of the cooling water in accordance with a temperature of the cooling water. More specifically, when the temperature of the cooling water is higher than a predetermined temperature, the circulation routes of the cooling water are switched so that the cooling water discharged from the fuel cell stack 1 is supplied to the fuel cell stack 1 again via the radiator 42. On the contrary, when the temperature of the cooling water is lower than the predetermined temperature, the circulation routes of the cooling water are switched so that the cooling water discharged from the fuel cell stack 1 flows through the bypass passage 43 without flowing though the radiator 42 to be supplied to the fuel cell stack 1 again.

The circulation pump 45 is provided on the cooling water circulating passage 41 at a downstream side of the three-way valve 44, and allows the cooling water to circulate.

The PTC heater 46 is provided on the bypass passage 43. A current is supplied to the PTC heater 46 when the fuel cell stack 20 is warmed up to increase the temperature of the cooling water.

The inlet water temperature sensor 47 is provided on the cooling water circulating passage 41 in the vicinity of a cooling water inlet port of the fuel cell stack 1. The inlet water temperature sensor 46 detects the temperature of the cooling water flowing into the fuel cell stack 1 (hereinafter, referred to as "inlet water temperature").

The outlet water temperature sensor 48 is provided on the cooling water circulating passage 41 in the vicinity of a cooling water outlet port of the fuel cell stack 1. The outlet water temperature sensor 48 detects the temperature of the cooling water discharged from the fuel cell stack 1 (hereinafter, referred to as an "outlet water temperature").

The power generating system 5 includes a current sensor 51, a voltage sensor 52, a traveling motor 53, an inverter 54, a battery 55, and a DC/DC converter 56.

The current sensor 51 detects a current taken out from the fuel cell stack 1 (hereinafter, referred to as an "output current").

The voltage sensor 42 detects an inter-terminal voltage between the anode electrode side output terminal 1a and the cathode electrode side output terminal 1b (hereinafter, referred to as an "output voltage"). Further, it is still better to be capable of detecting a voltage of one piece of the fuel cell 10 constituting the fuel cell stack 1. Moreover, it may be configured so that a voltage can be detected every plural fuel cells 10.

The traveling motor 53 is a three-phase synchronous motor in which permanent magnets are embedded in a rotor and a stator coil is wound around a stator. The traveling motor 53 has a function as an electric motor that receives supply of the electric power from the fuel cell stack 1 and the battery 55 to be rotatably driven, and a function as a power generator that generates an electromotive force between both ends of the stator coil at the time of deceleration of the vehicle in which the rotor is caused to rotate by means of an external force.

The inverter 54 is configured by a plurality of semiconductor switches, such as an IGBT (Insulated Gate Bipolar Transistor), for example. Opening and closing of each of the semiconductor switches in the inverter 54 is controlled by the controller 6 to convert a DC electric power to an AC electric power or convert an AC electric power to a DC electric power. When the traveling motor 53 is caused to function as an electric motor, the inverter 54 converts a composite DC electric power of the electric power generated by the fuel cell stack 1 and the electric power outputted from the battery 55 into a three-phase AC electric power to supply the three-phase AC electric power to the traveling motor 53. On the other hand, when the traveling motor 53 is caused to function as a power generator, the inverter 54 converts a regenerative electric power of the traveling motor 53 (three-phase AC electric power) into a DC electric power to supply the DC electric power to the battery 55.

An excess value of the generated electric power of the fuel cell stack 1 (the output current×the output voltage) and a regenerative electric power of the traveling motor 53 are charged in the battery 55. The electric power charged in the battery 55 is supplied to auxiliary machines such as the cathode compressor 25 and the traveling motor 53 if necessary.

The DC/DC convertor 56 is a bidirectional voltage converter that raises or drops the output voltage of the fuel cell stack 1. The DC/DC convertor 56 controls the output voltage of the fuel cell stack 1, whereby the output current of the fuel cell stack 1 is controlled, and the generated electric power is controlled furthermore.

The controller 6 is configured by a microcomputer that includes a Central Processing Unit (CPU), a Read Only Memory (ROM), a Random Access Memory (RAM) and an input/output interface (I/O interface).

Signals from various kinds of sensors for detecting an operation state of the fuel cell system 100 are inputted to the controller 6 in addition to the air flow sensor 24 and the like described above. The signals include signals of: an accelerator stroke sensor 61 for detecting a pressing amount of an accelerator pedal (hereinafter, referred to as an "accelerator operating amount") and an outside air temperature sensor 62 for detecting an outside air temperature.

The controller 6 calculates a target output current of the fuel cell stack 1 on the basis of the operation state of the fuel cell system 100. More specifically, the controller 6 calculates the target output current of the fuel cell stack 1 on the basis of a required electric power of the traveling motor 53, a required electric power of auxiliary machines, such as the cathode compressor 25 and the like, and a charging/discharging request of the battery 55.

The controller 6 then controls the output voltage of the fuel cell stack 1 by means of the DC/DC converter 56 so that the output current of the fuel cell stack 1 becomes the target output current, thereby supplying necessary electric power to the traveling motor 53 and the auxiliary machines. Further, the controller 6 controls the flow rate and the pressure of the cathode gas to be supplied to the fuel cell stack 1 in accordance with the target output current. More specifically, the controller 6 controls so that the larger the target output current becomes, the larger the flow rate and the pressure of the cathode gas to be supplied to the fuel cell stack 1.

Further, the controller 6 controls the cathode compressor 25 and the circulation pump 45 so that a degree of wetness (water content) of the electrolyte membrane 111 becomes the degree of wetness suitable for the electric power generation. More specifically, the controller 6 calculates an internal impedance of the fuel cell stack 1 (High Frequency Resistance; hereinafter, referred to as a "HFR"), which is correlation with the degree of wetness of the electrolyte membrane 111, by means of an AC impedance method or the like, for example. The controller 6 then controls the cathode compressor 25, the circulation pump 45, and the like so that the HFR becomes a target value.

Further, the controller 6 carries out, on the basis of the operation state of the fuel cell system 100, a pulsating operation in which the anode pressure is periodically increased and decreased. In the pulsating operation, the anode pressure is periodically increased and decreased within a range between a pulsation upper limit pressure and a pulsation lower limit pressure, which are basically set up in accordance with the target output current of the fuel cell stack 1, thereby pulsating the anode pressure. By carrying out the pulsating operation, a liquid water in the anode gas flow passages 121 is discharged to the anode gas discharge passage 35 when the anode pressure is increased. This ensures a drainage property in the anode gas flow passages 121.

Further, in a case where such a pulsating operation is carried out, a differential pressure between an anode side and a cathode side of the electrolyte membrane within the fuel cell 10 (an inter-membrane differential pressure) varies by pulsating the anode pressure. In a case where this inter-membrane differential pressure becomes excessive or the pressure of the anode side becomes higher or lower than the pressure of the cathode side by pulsating the anode pressure, unanticipated internal stress is applied to the electrolyte membrane 111. This causes mechanical strength of the electrolyte membrane 111 to be lowered, and this further causes the fuel cell 10 to be deteriorated.

Therefore, the controller 6 controls each of the anode pressure and the cathode pressure so that the anode pressure becomes the cathode pressure or higher and the inter-membrane differential pressure does not become higher than a predetermined allowable inter-membrane differential pressure. The allowable inter-membrane differential pressure is an upper limit value of the inter-membrane differential pressure set up in advance by an experiment or the like in order not to add unanticipated internal stress to the electrolyte membrane 111, that is, in order not to lower the mechanical strength of the electrolyte membrane 111 or in order to fall into lowering within an allowed range even though the mechanical strength is lowered. In the present embodiment, the allowable inter-membrane differential pressure is set up to a value obtained by lowering from 110 [kPa] to 90 [kPa] in view of a control error or the like due to a detection error of the anode pressure sensor 34 or overshoot when the anode pressure is pulsated. In this regard, a value of the allowable inter-membrane differential pressure thus mentioned as an example is merely a reference value, it may be changed appropriately in accordance with a performance of the electrolyte membrane 111 and the like.

Here, at the time of boot of the electric power generation by the fuel cell stack 1, such as at the time of start or IS recovery of the fuel cell system 100, it is normally in a state that an air is mixed in the anode gas flow passages 121 as an impurity. For that reason, at the time of start of the electric power generation by the fuel cell stack 1, it is needed to discharge the air in the anode gas flow passages 121, especially an air of the anode gas flow passages 121 that faces the active area to the outside of the active area.

Therefore, at the time of the boot, the inter-membrane differential pressure is allowed to become the allowable inter-membrane differential pressure or higher, a target anode pressure is set up to the maximum pressure (a system upper limit value), for example, and is controlled so that the anode pressure becomes as high as possible. This makes it possible to force out all the air in the anode gas flow passages 121 from the active area, and to displace the air in the anode gas flow passages 121 by the anode gas quickly.

On the other hand, in a case where the inter-membrane differential pressure is also allowed to become the allowable inter-membrane differential pressure or higher at the time of the IS recovery, it is concerned that the mechanical strength of the electrolyte membrane is deteriorated. There is a fear that durability performance of the fuel cell to be required cannot be ensured because frequency of the IS recovery is larger compared with that of a normal boot.

For that reason, it may be thought that at the time of the IS recovery, the target anode pressure is set to be as high as possible within a range that the inter-membrane differential pressure does not exceed the allowable inter-membrane differential pressure on the basis of the cathode pressure that varies in accordance with the target output current (load) of the fuel cell stack, for example.

However, this causes the target anode pressure at the time of the IS recovery to become lowered basically compared with the target anode pressure at the time of the boot, which is set up to the maximum pressure. For this reason, there is a possibility that the air in the anode gas flow passages 121 cannot be displaced by the anode gas completely.

In such a case, it is necessary to gradually discharge the air remaining in the active area of the anode gas flow passages 121 to the anode gas discharge passage 35 by purging the anode-off gas. However, in a case where a load of the fuel cell stack 1 is lowered during purge and the anode pressure is thus lowered together with lowing of the cathode pressure, there is a fear that the air discharged to the anode gas discharge passage 35 flows backward to the inside of the active area of the anode gas flow passages 121 again.

Thus, in a case where the temporarily discharged air flows backward to the active area again in a state that the air remains in the active area of the anode gas flow passages 121, hydrogen required for the electrode reaction lacks downstream of the active area, thereby promoting occurrence of starvation.

Therefore, in the present embodiment, the anode pressure is controlled at the time of the IS recovery so that occurrence of starvation can be suppressed while suppressing the mechanical strength of the electrolyte membrane 111 from being deteriorated.

Figure 4:
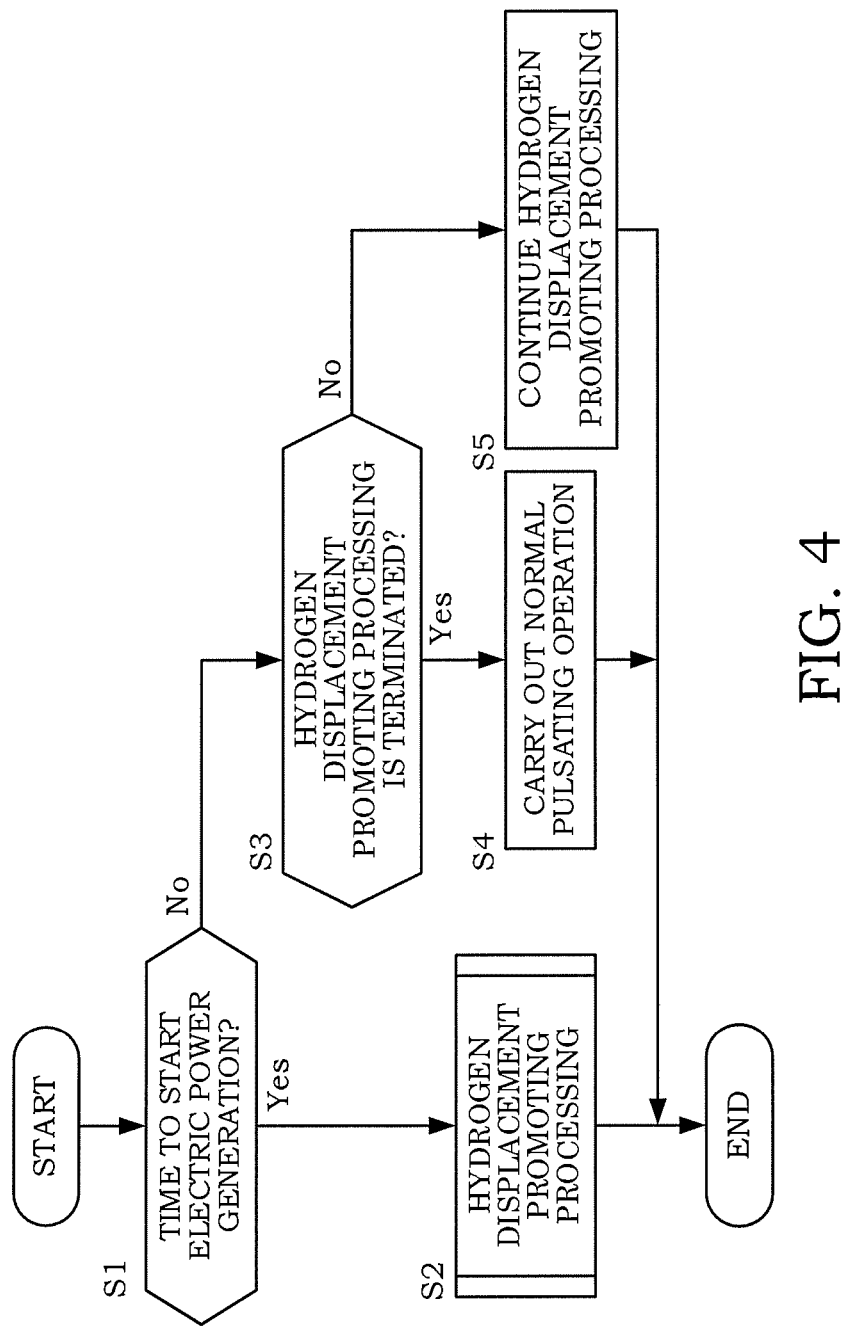
FIG. 4 is a flowchart for explaining an anode pressure control according to one embodiment of the present invention.

FIG. 4 is a flowchart for explaining an anode pressure control according to the present embodiment.

At Step S1, the controller 6 determines whether it is a time to start electric power generation by the fuel cell stack 1 or not. More specifically, the controller 6 determines whether it is a time to boot or a time to IS recovery. The controller 6 carries out a process at Step S2 in a case where it is the time to start the electric power generation. Otherwise, the controller 6 carries out a process at Step S3.

At Step S2, the controller 6 carries out hydrogen displacement promoting processing. The hydrogen displacement promoting processing is processing to early displace an impurity, such as an air and the like, which is accumulated within an anode system including the anode gas flow passages 121, the buffer tank 36 and the like during stop or IS of the fuel cell system 100 by the anode gas (hydrogen) after boot or recovery of the IS. Details of the hydrogen displacement promoting processing will be described later with reference to FIG. 8.

At Step S3, the controller 6 determines whether the hydrogen displacement promoting processing is terminated or not. The controller 6 carries out a process at Step S4 in a case where it is determined that the hydrogen displacement promoting processing is terminated. The controller 6 carries out a process at Step S5 in a case where it is determined that the hydrogen displacement promoting processing is not terminated.

At Step S4, the controller 6 carris out a normal pulsating operation. The normal pulsating operation is a process to carry out a normal pulsating operation, in which the anode pressure is periodically increased and decreased on the basis of the operation state of the fuel cell system 100, in order to ensure a drainage property. Details of the normal pulsating operation will be described later with reference to FIG. 5.

At Step S5, the controller 6 continues the hydrogen displacement promoting processing.

Hereinafter, the normal pulsating operation that is carried out after the hydrogen displacement promoting processing is terminated will first be described with reference to FIG. 5.

Figure 5:
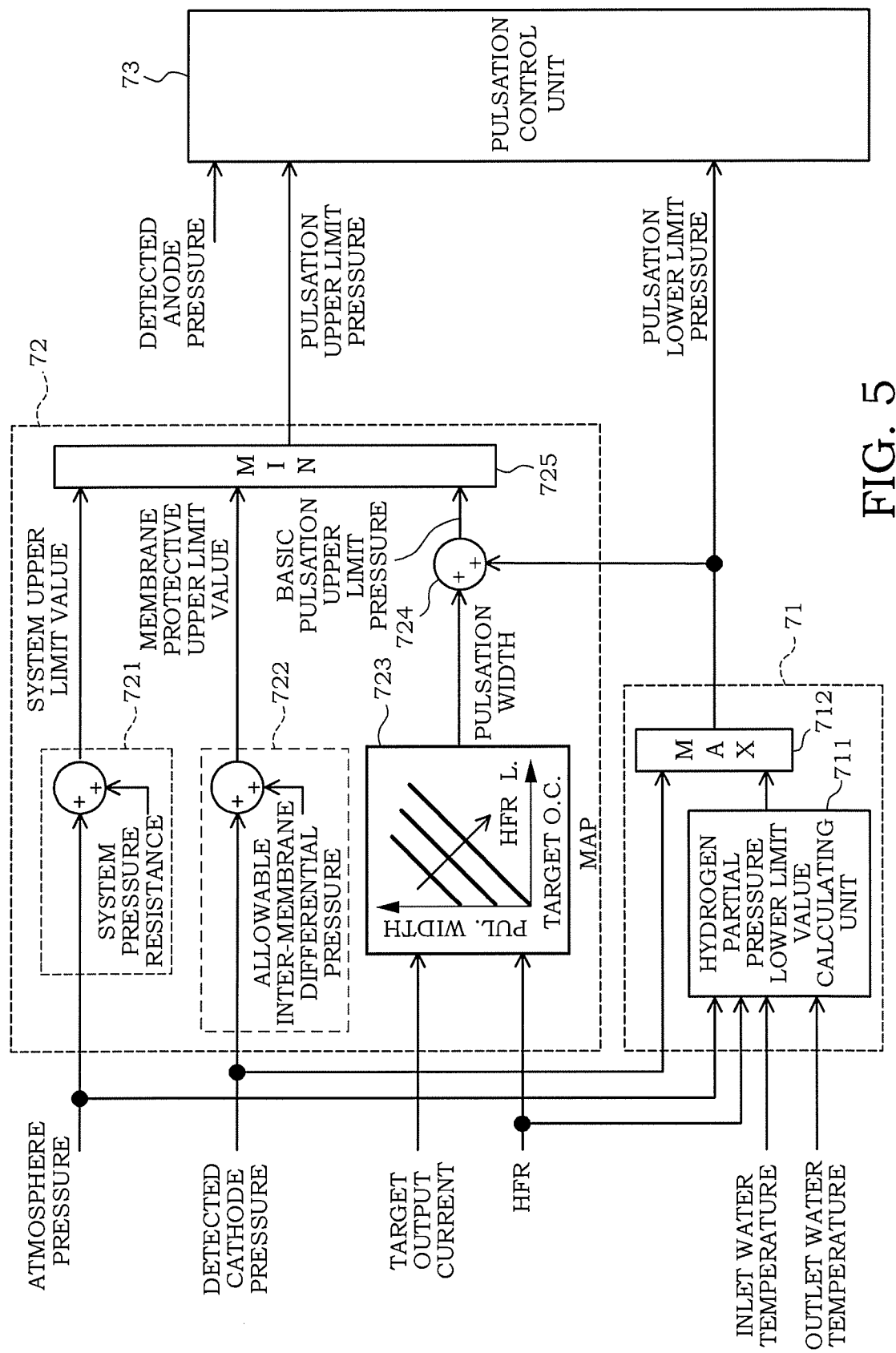
FIG. 5 is a block diagram for explaining the content of a normal pulsating operation.

FIG. 5 is a block diagram for explaining the content of the normal pulsating operation. In order to carry out a normal pulsating operation process, the controller 6 includes a pulsation lower limit pressure calculating unit 71, a pulsation upper limit pressure calculating unit 72, and a pulsation control unit 73.

The detected cathode pressure, an atmosphere pressure, the HFR, the inlet water temperature and the outlet water temperature are inputted to the pulsation lower limit pressure calculating unit 71. The pulsation lower limit pressure calculating unit 71 calculates, on the basis of these inputted values, a target value of the anode pressure of a lower limit side at the time of the normal pulsating operation (hereinafter, referred to as a "pulsation lower limit pressure"). Hereinafter, the pulsation lower limit pressure calculating unit 71 will be described in detail.

The pulsation lower limit pressure calculating unit 71 includes a hydrogen partial pressure lower limit value calculating unit 711 and a pulsation lower limit pressure setting unit 712.

The hydrogen partial pressure lower limit value calculating unit 711 calculates a lower limit value of the anode pressure required to ensure a hydrogen partial pressure within the anode gas flow passages 121 (hereinafter, referred to as a "hydrogen partial pressure lower limit value").

As described above, the impurities such as nitrogen and moisture penetrates into the anode gas flow passages 121 from the cathode gas flow passages 131 via the MEA 11. The higher a temperature of the fuel cell stack 1 becomes, the more a penetration amount of these impurities becomes. Further, the higher the temperature of the fuel cell stack 1 becomes, the more an amount of saturated vapor water becomes. For that reason, the higher the temperature of the fuel cell stack 1 becomes, the higher a partial pressure of the impurity in the anode gas flow passages 121 becomes relatively. This causes the hydrogen partial pressure to be lowered relatively. In a case where the hydrogen partial pressure becomes too low, the hydrogen concentration in the active area of the anode gas flow passages 121 becomes lowered. There is a fear that the fuel cell 10 is deteriorated in a case where the electric power generation is continued at this state.

Therefore, in the present embodiment, the hydrogen partial pressure lower limit value is calculated as the lower limit value of the anode pressure necessary for ensuring the hydrogen partial pressure in the anode gas flow passages 121, and is controlled so that the anode pressure does not become lower than the hydrogen partial pressure lower limit value.

Figure 6:
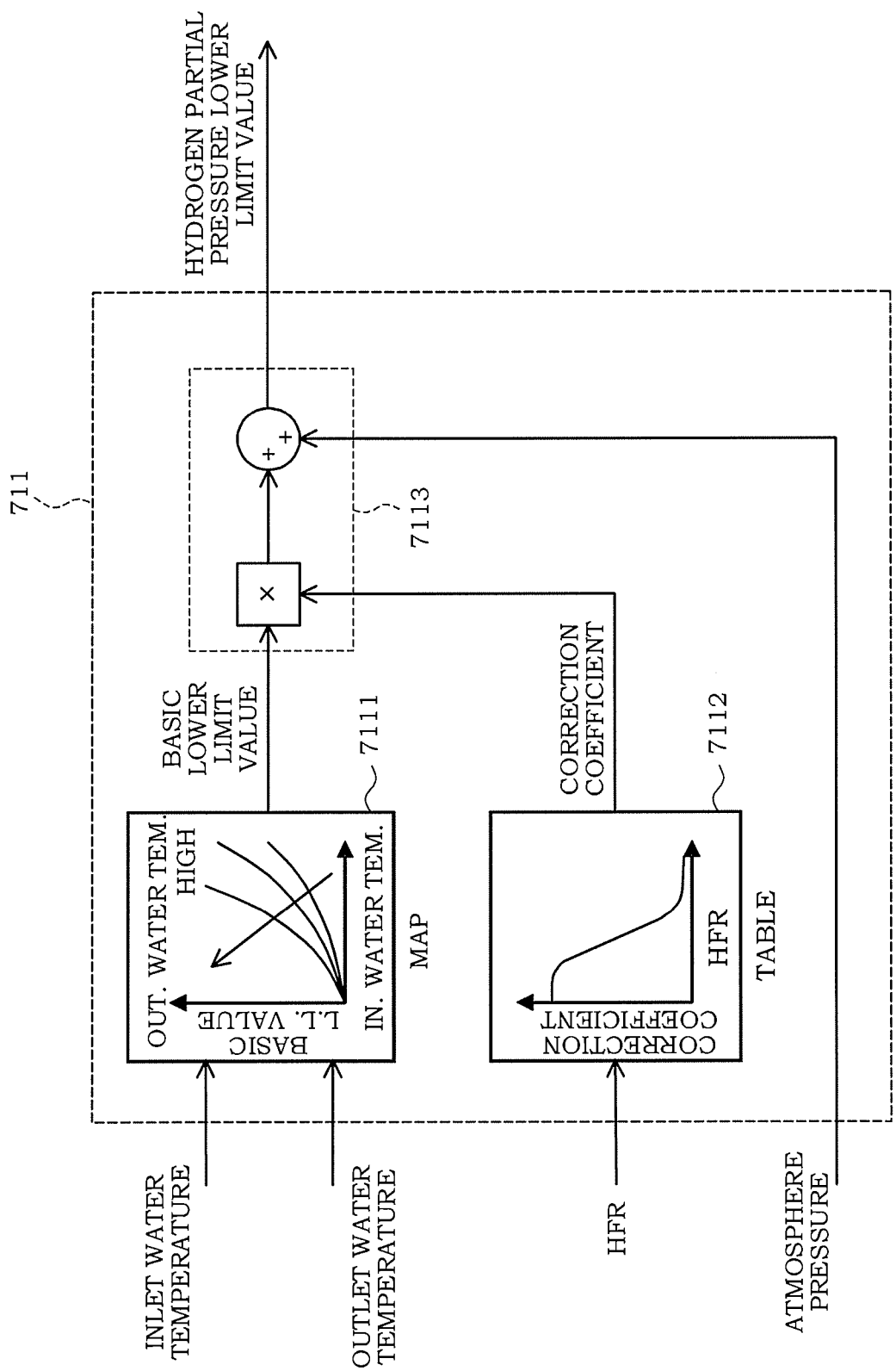
FIG. 6 is a block diagram showing a detailed configuration of a hydrogen partial pressure lower limit value calculating unit.

FIG. 6 is a block diagram showing a detailed configuration of the hydrogen partial pressure lower limit value calculating unit 711.

The hydrogen partial pressure lower limit value calculating unit 711 includes a base lower limit value calculating unit 7111, a correction coefficient calculating unit 7112, and a hydrogen partial pressure lower limit value calculating unit 7113.

The inlet water temperature and the outlet water temperature are inputted to the base lower limit value calculating unit 7111. The base lower limit value calculating unit 7111 refers to a map shown in FIG. 6, and calculates a basic lower limit value on the basis of the inlet water temperature and the outlet water temperature. As shown in the map of FIG. 6, the higher the inlet water temperature becomes and the higher the outlet water temperature becomes, the larger the basic lower limit value becomes. In other words, the higher the temperature of the fuel cell stack 1 becomes, the larger the basic lower limit value becomes. As described above, this is because the higher the temperature of the fuel cell stack 1 becomes, the more the hydrogen partial pressure in the anode gas flow passages 121 is lowered relatively.

The HFR is inputted to the correction coefficient calculating unit 7112. The correction coefficient calculating unit 7112 refers to a table of FIG. 6 to calculate a correction coefficient on the basis of the HFR. As shown in the table of FIG. 6, the smaller the HFR is, the larger the correction coefficient becomes. This is because it is thought that the smaller the HFR is, the higher the water content of the electrolyte membrane 111 is, and the larger a moisture amount in the anode gas flow passages 121 is.

The hydrogen partial pressure lower limit value calculating unit 7113 calculates one converted to an absolute pressure obtained by adding the atmosphere pressure to a gauge hydrogen partial pressure lower limit value obtained by multiplying the correction coefficient by the basic lower limit value as the hydrogen partial pressure lower limit value.

Returning to FIG. 4 again, the pulsation lower limit pressure setting unit 712 of the pulsation lower limit pressure calculating unit 71 will be described.

The detected cathode pressure and the hydrogen partial pressure lower limit value are inputted to the pulsation lower limit pressure setting unit 712. The pulsation lower limit pressure setting unit 712 sets up larger one of these two inputted values as the pulsation lower limit pressure. The pulsation lower limit pressure setting unit 712 normally sets up the detected cathode pressure as the pulsation lower limit pressure. Then, when the hydrogen partial pressure lower limit value increases in accordance with the operation state of the fuel cell system 100 and reaches larger than the detected cathode pressure, the pulsation lower limit pressure setting unit 712 sets up the hydrogen partial pressure lower limit value as the pulsation lower limit pressure to ensure the hydrogen partial pressure.

Thus, in the present embodiment, it is set so that the pulsation lower limit pressure always becomes the detected cathode pressure or higher. In other words, the pressure at the anode side in the fuel cell stack 1 always becomes the pressure at the cathode side or higher. This is because of the following reason. For example, in a case where a lower limit pressure during the pulsation is set up to a value lower than the detected cathode pressure, an upper limit pressure during the pulsation may become higher than the detected cathode pressure. For that reason, by carrying out the pulsating operation, a state that the pressure at the anode side becomes higher than the pressure at the cathode side and a state that the pressure at the anode side becomes lower than the pressure at the cathode side are periodically repeated in the fuel cell stack 1. In such a case, the MEA 11 periodically waves due to a pressure difference between the anode side and the cathode side, and there is a fear that this causes the MEA 11 to be deteriorated. Therefore, a pressure obtained by adding a predetermined margin to the detected cathode pressure may be inputted to the pulsation lower limit pressure setting unit 712 in place of the detected cathode pressure.

The atmosphere pressure, the detected cathode pressure, the target output current, and the HFR are inputted to the pulsation upper limit pressure calculating unit 72. The pulsation upper limit pressure calculating unit 72 calculates, on the basis of these inputted values, a target value of the anode pressure at an upper side at the time of the normal pulsating operation (hereinafter, referred to as a "pulsation upper limit pressure"). Hereinafter, the pulsation upper limit pressure calculating unit 72 will be described in detail.

The pulsation upper limit pressure calculating unit 72 includes a system upper limit value calculating unit 721, a membrane protective upper limit value calculating unit 722, a pulsation width calculating unit 723, a basic pulsation upper limit pressure calculating unit 724, and a pulsation upper limit pressure setting unit 725.

The atmosphere pressure is inputted to the system upper limit value calculating unit 721. The system upper limit value calculating unit 721 calculates one obtained by adding a predetermined system pressure resistance to the atmosphere pressure as an upper limit value of the anode pressure (hereinafter, referred to as a "system upper limit value") necessary for ensuring durability of the fuel cell system 100. The system pressure resistance is a predetermined value appropriately set up in accordance with a pressure resistance performance of each of the fuel cell stack 1, the anode gas supply passage 32 and the like, and in the present embodiment, it is set up to 170 [kPa]. In this regard, a value of the system pressure resistance thus mentioned as an example is merely a reference value. The system upper limit value is a restricted value at an upper side of the anode pressure so that a pressure exceeding the pressure resistance performance is not applied to the fuel cell stack 1, the anode gas supply passage 32 and the like, and is the maximum value of the anode pressure that can be allowed for the fuel cell system 100.

The detected cathode pressure is inputted to the membrane protective upper limit value calculating unit 722. The membrane protective upper limit value calculating unit 722 calculates one obtained by adding the allowable inter-membrane differential pressure to the detected cathode pressure as an upper limit value of the anode pressure (hereinafter, referred to as a "membrane protective upper limit value") necessary for ensuring durability of the electrolyte membrane 111. The membrane protective upper limit value is a restricted value at an upper side of the anode pressure so that the differential pressure between the anode side and the cathode side in the fuel cell stack 1 does not become so excessive value that the electrolyte membrane 111 is deteriorated.

The target output current and the HFR are inputted to the pulsation width calculating unit 723. The pulsation width calculating unit 723 refers to a map shown in FIG. 5 to calculate a pulsation width on the basis of the target output current and the HFR. As shown in the map of FIG. 5, the higher the target output current becomes or the smaller the HFR becomes, the larger the pulsation width becomes. In other words, the larger the moisture amount in the fuel cell stack 1 becomes, the larger the pulsation width becomes.

The pulsation width and the pulsation lower limit pressure are inputted to the basic pulsation upper limit pressure calculating unit 724. The basic pulsation upper limit pressure calculating unit 724 calculates one obtained by adding the pulsation lower limit pressure to the pulsation width as a basic pulsation upper limit pressure.

The system upper limit value, the membrane protective upper limit value, and the basic pulsation upper limit pressure are inputted to the pulsation upper limit pressure setting unit 725. The pulsation upper limit pressure setting unit 725 sets up the smallest one of these three inputted values as the pulsation upper limit pressure. The pulsation upper limit pressure setting unit 725 normally sets up the basic pulsation upper limit pressure as the pulsation upper limit pressure. Then, when the basic pulsation upper limit pressure becomes higher than the system upper limit value or the membrane protective upper limit value, the system upper limit value or the membrane protective upper limit value is set up as the pulsation upper limit pressure.

Thus, when the system upper limit value or the membrane protective upper limit value is set up as the pulsation upper limit pressure, an actual pulsation width is restricted to be smaller than the pulsation width set up in accordance with the target output current.

The detected anode pressure, the pulsation upper limit pressure, the pulsation lower limit pressure, and a pressure rising change rate are inputted to the pulsation control unit 73. The pulsation control unit 73 controls the anode pressure regulating valve 33 on the basis of these inputted values in accordance with a flowchart of FIG. 7 to pulsate the anode pressure.

Figure 7:
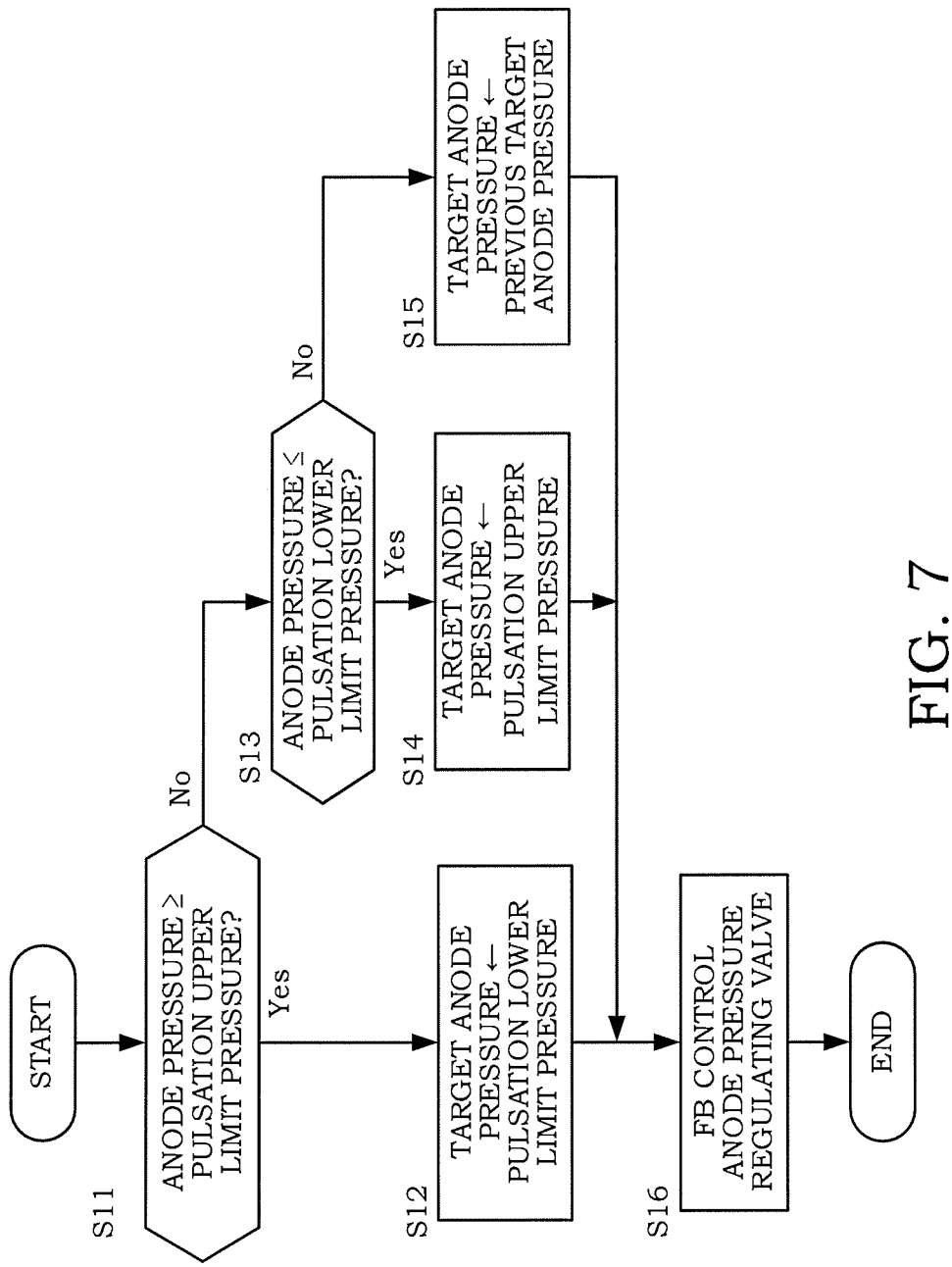
FIG. 7 is a flowchart showing a detailed configuration of a pulsation control unit.

FIG. 7 is a flowchart showing a detailed configuration of the pulsation control unit 73.

At Step S11, the controller 6 determines whether or not the anode pressure is the pulsation upper limit pressure or higher. In a case where the anode pressure is the pulsation upper limit pressure or higher, the controller 6 carries out a process at Step S12 in order to reduce the anode pressure. On the other hand, in a case where the anode pressure is lower than the pulsation upper limit pressure, the controller 6 carries out a process at Step S13.

At Step S12, the controller 6 sets up the target anode pressure to the pulsation lower limit pressure.

At Step S13, the controller 6 determines whether or not the anode pressure is the pulsation lower limit pressure or lower. In a case where the anode pressure is the pulsation lower limit pressure or lower, the controller 6 carries out a process at Step S14 in order to increase the anode pressure. On the other hand, in a case where the anode pressure is higher than the pulsation lower limit pressure, the controller 6 carries out a process at Step S15.

At Step S14, the controller 6 sets up the target anode pressure to the pulsation upper limit pressure.

At Step S15, the controller 6 sets up the target anode pressure to the target anode pressure the same as the previous time.

At Step S16, the controller 6 carries out a feedback control for the anode pressure regulating valve 33 so that the anode pressure becomes the pulsation lower limit pressure when the pulsation lower limit pressure is set up as the target anode pressure. As a result of this feedback control, an opening degree of the anode pressure regulating valve 33 is normally zero (fully closed), and a supply of the anode gas from the high-pressure tank 31 to the fuel cell stack 1 is stopped. As a result, consumption of the anode gas in the fuel cell stack 1 due to the electric power generation causes the anode pressure to be lowered.

On the other hand, the controller 6 carries out the feedback control for the anode pressure regulating valve 33 so that the anode pressure is raised (or increased) to the pulsation upper limit pressure with a predetermined pressure rising change rate when the pulsation upper limit pressure is set up as the target anode pressure. As a result of this feedback control, the anode pressure regulating valve 33 is opened to a desired opening degree to supply the anode gas from the high-pressure tank 31 to the fuel cell stack 1, and the anode pressure is thus increased with the predetermined pressure rising change rate.

Next, the hydrogen displacement promoting processing will be described with reference to FIG. 8.

Figure 8:
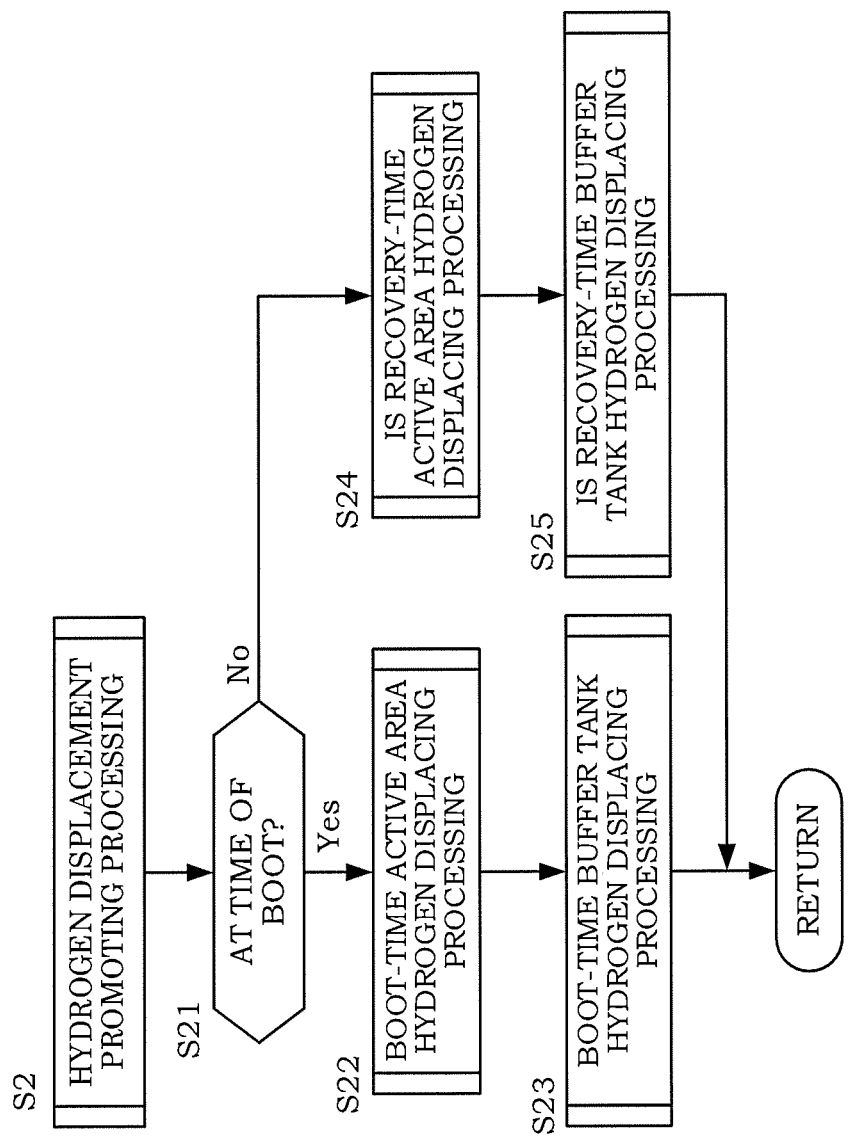
FIG. 8 is a flowchart for explaining hydrogen displacement promoting processing.

FIG. 8 is a flowchart for explaining the hydrogen displacement promoting processing.

At Step S21, the controller 6 determines whether it is the time of boot or the time of IS recovery. In the time of the boot, the controller 6 carries out a process at Step S22. On the other hand, in the time of the IS recovery, the controller 6 carries out a process at Step S24.

At Step S22, the controller 6 carries out boot-time active area hydrogen displacing processing. This processing is processing in which the anode pressure is raised to the maximum pressure, that is, the system upper limit value, all the impurity in the anode gas flow passages 121 is forced out to the buffer tank 36, and the anode gas flow passages 121 are displaced by the anode gas. Details of the boot-time active area hydrogen displacing processing will be described later with reference to FIG. 9.

At Step S23, the controller 6 carries out boot-time buffer tank hydrogen displacing processing. This processing is processing to discharge the impurity within the buffer tank 36 to the outside of the fuel cell system 100 and to displace the inside of the buffer tank 36 by the anode gas by opening the purge valve 38 while carrying out a pulsating operation for the time of the boot, in which the pulsation lower limit pressure is set up to higher than the normal pulsating operation (hereinafter, referred to as a "boot-time pulsating operation"), after boot-time active area hydrogen displacing processing is terminated. Details of the boot-time buffer tank hydrogen displacing processing will be described later with reference to FIG. 10 and FIG. 11.

At Step S24, the controller 6 carries out IS recovery-time active area hydrogen displacing processing. This processing is processing in which the anode pressure is raised to a predetermined impurity backflow preventing upper limit pressure obtained by adding the allowable inter-membrane differential pressure to the atmosphere pressure, the impurity accumulated in the anode gas flow passages 121 during the IS is forced out to the buffer tank 36 side, the impurity that cannot be forced out and remains in the anode gas flow passages 121 is then discharged from the anode gas flow passages 121 by further raising the anode pressure or purging, and the anode gas flow passages 121 is displaced by the anode gas. Details of the IS recovery-time active area hydrogen displacing processing will be described later with reference to FIG. 12.

At Step S25, the controller 6 carries out IS recovery-time buffer tank hydrogen displacing processing. This processing is processing in which by opening the purge valve 38 while carrying out a pulsating operation at the time of recovery from the IS (hereinafter, referred to as an "IS recovery-time pulsating operation") after the IS recovery-time active area hydrogen displacing processing is terminated, the impurity in the buffer tank 36 is discharged to the outside of the fuel cell system 100 and the inside of the buffer tank 36 is displaced by the anode gas. Details of the IS recovery-time buffer tank hydrogen displacing processing will be described later with reference to FIG. 13 and FIG. 14.

Figure 9:
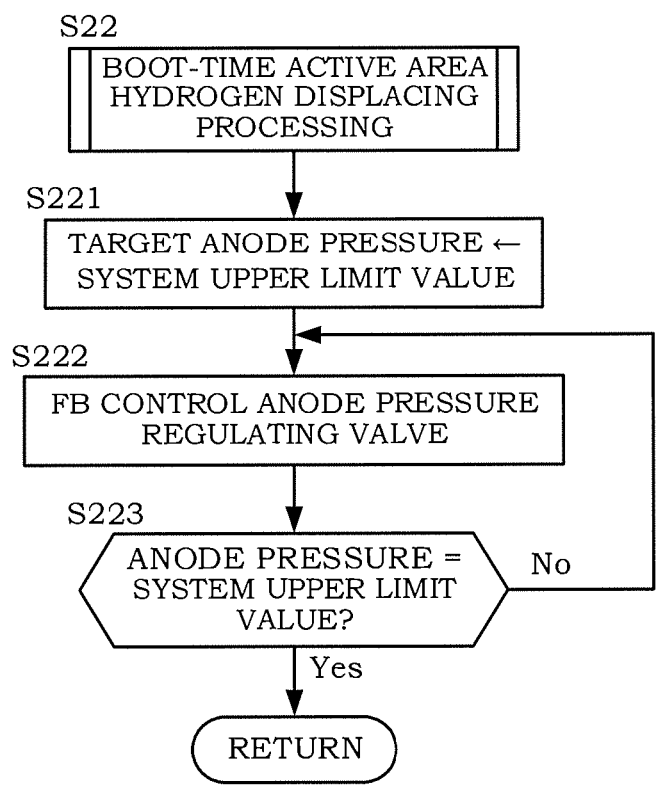
FIG. 9 is a flowchart for explaining the content of boot-time active area hydrogen displacing processing.

FIG. 9 is a flowchart for explaining the content of the boot-time active area hydrogen displacing processing.

At Step S221, the controller 6 sets up the target anode pressure to the system upper limit value.

At Step S222, the controller 6 carries out the feedback control for the anode pressure regulating valve 33 so that the detected anode pressure becomes the system upper limit value. As a result of this feedback control, the anode pressure regulating valve 33 is opened to desired opening degree to supply the anode gas from the high-pressure tank 31 to the fuel cell stack 1, whereby the anode pressure is increased.

At Step S223, the controller 6 determines whether the detected anode pressure is controlled to the system upper limit value or not. In a case where the detected anode pressure is controlled to the system upper limit value, the controller 6 terminates the processing this time while remaining a state that the target anode pressure is set up to the system upper limit value, and shifts to the boot-time buffer tank hydrogen displacing processing. On the other hand, in a case where the detected anode pressure does not rise to the system upper limit value, the controller 6 returns to the process at Step S222.

Figure 10:
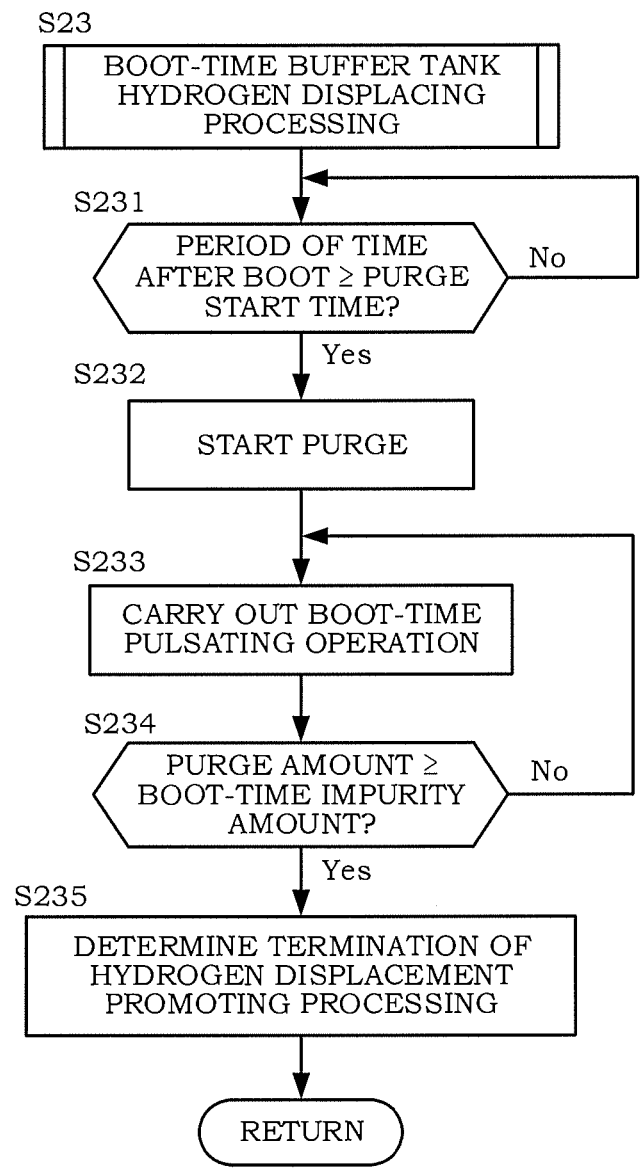
FIG. 10 is a flowchart for explaining the content of boot-time buffer tank hydrogen displacing processing.

FIG. 10 is a flowchart for explaining the content of the boot-time buffer tank hydrogen displacing processing.

At Step S231, the controller 6 determines whether a period of time since the fuel cell system 100 is booted (hereinafter, referred to as a "period of time after the boot") becomes a predetermined purge start time or not. The purge start time is a time required after the fuel cell system 100 is booted until a dilution request (a request to cause the hydrogen concentration in a discharged gas to become a predetermined concentration or lower) can be ensured. The purge start time is set up to become longer than a time after the fuel cell system 100 is booted until the cathode off-gas reaches the cathode gas discharge passage 22. In a case where the period of time after the boot is the purge start time or longer, the controller 6 carries out a process at Step S232. On the other hand, in a case where the period of time after the boot is less than the purge start time, the controller 6 controls the anode pressure to the system upper limit value until the period is the purge start time or longer.

At Step S232, the controller 6 opens the purge valve 38 to start purge.

At Step S233, the controller 6 carries out the boot-time pulsating operation. The content of the boot-time pulsating operation will be described later with reference to FIG. 11.

At Step S234, the controller 6 determines whether the impurity such as the air and the like accumulated in the anode system during stop of the fuel cell system 100 can be discharged by the purge or not, that is, whether the inside of the buffer tank 36 can be displaced by the anode gas by means of the purge or not. More specifically, the controller 6 determines that the inside of the buffer tank 36 can be displaced by the anode gas when a purge amount becomes an impurity amount that exists in the anode system at the time of the boot (hereinafter, referred to as a "boot-time impurity amount") or more. In this regard, assuming that the whole anode system including the anode gas flow passages 121, the buffer tank 36 and the like is fulfilled with the impurity at the time of the boot, the boot-time impurity amount is set to a volume in the anode system. In this regard, unit of the volume is appropriately changed from litter to normal litter in accordance with the anode pressure and the stack temperature. In a case where it is determined that the inside of the buffer tank 36 can be displaced by the anode gas, the controller 6 carries out a process at Step S235. Otherwise, the controller 6 carries out the purge while continuously carrying out the boot-time pulsating operation.

At Step S235, the controller 6 determines that the hydrogen displacement promoting processing is terminated.

Figure 11:
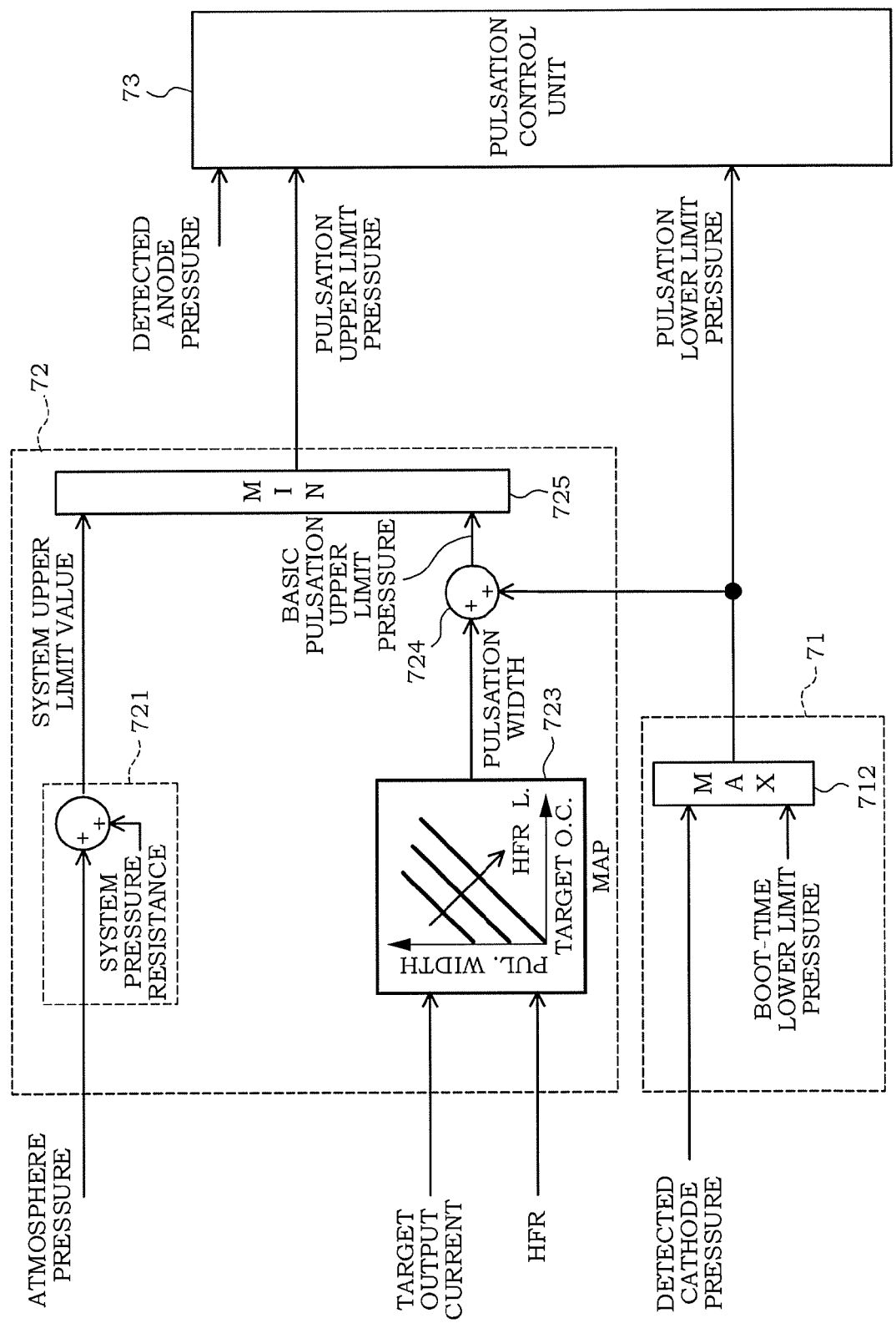
FIG. 11 is a block diagram for explaining the content of a boot-time pulsating operation.

FIG. 11 is a block diagram for explaining the content of the boot-time pulsating operation. In this regard, portions serving as the similar functions in the normal pulsating operation process described above are denoted by the same reference numerals, and the overlapping explanation will be omitted appropriately.

As shown in FIG. 11, in the boot-time pulsating operation, the system upper limit value and the basic pulsation upper limit pressure are inputted to the pulsation upper limit pressure setting unit 725, and smaller one of these two inputted values is set up as the pulsation upper limit pressure.

Further, the detected cathode pressure and a predetermined boot-time lower limit pressure are inputted to the pulsation lower limit pressure setting unit 712, and larger one of these two inputted values is set up as the pulsation lower limit pressure. In this regard, the boot-time lower limit pressure is a predetermined value set up in order to carry out the pulsating operation in a state that the pulsation lower limit pressure is kept to become as high as possible, and is set up to an active area hydrogen displacement completed pressure (will be described later), for example. Therefore, the pulsation lower limit pressure setting unit 712 normally sets up the boot-time lower limit pressure as the pulsation lower limit pressure.

Here, the purge flow rate (a purge amount per unit time) increases as a differential pressure between a pressure upstream of the purge valve 38 (equivalent to the anode pressure) and a pressure downstream thereof (equivalent to the atmosphere pressure) becomes larger. In other words, the higher the anode pressure becomes, the more the purge flow rate increases. Therefore, by carrying out the pulsating operation in the state that the pulsation lower limit pressure is kept to as high as possible, the impurity flows backward to the fuel cell stack 1 side from the buffer tank 36 when the anode pressure is lowered from the pulsation upper limit pressure toward the pulsation lower limit pressure. This makes it possible to increase the flow rate of the impurity discharged to the purge passage 37.

Thus, in the boot-time pulsating operation, by carrying out the pulsating operation in the state that the pulsation lower limit pressure is kept to as high as possible, the impurity in the buffer tank 36 can be discharged to the outside of the system efficiently, and this makes it possible to promote the hydrogen displacement in the buffer tank 36.

Figure 12:
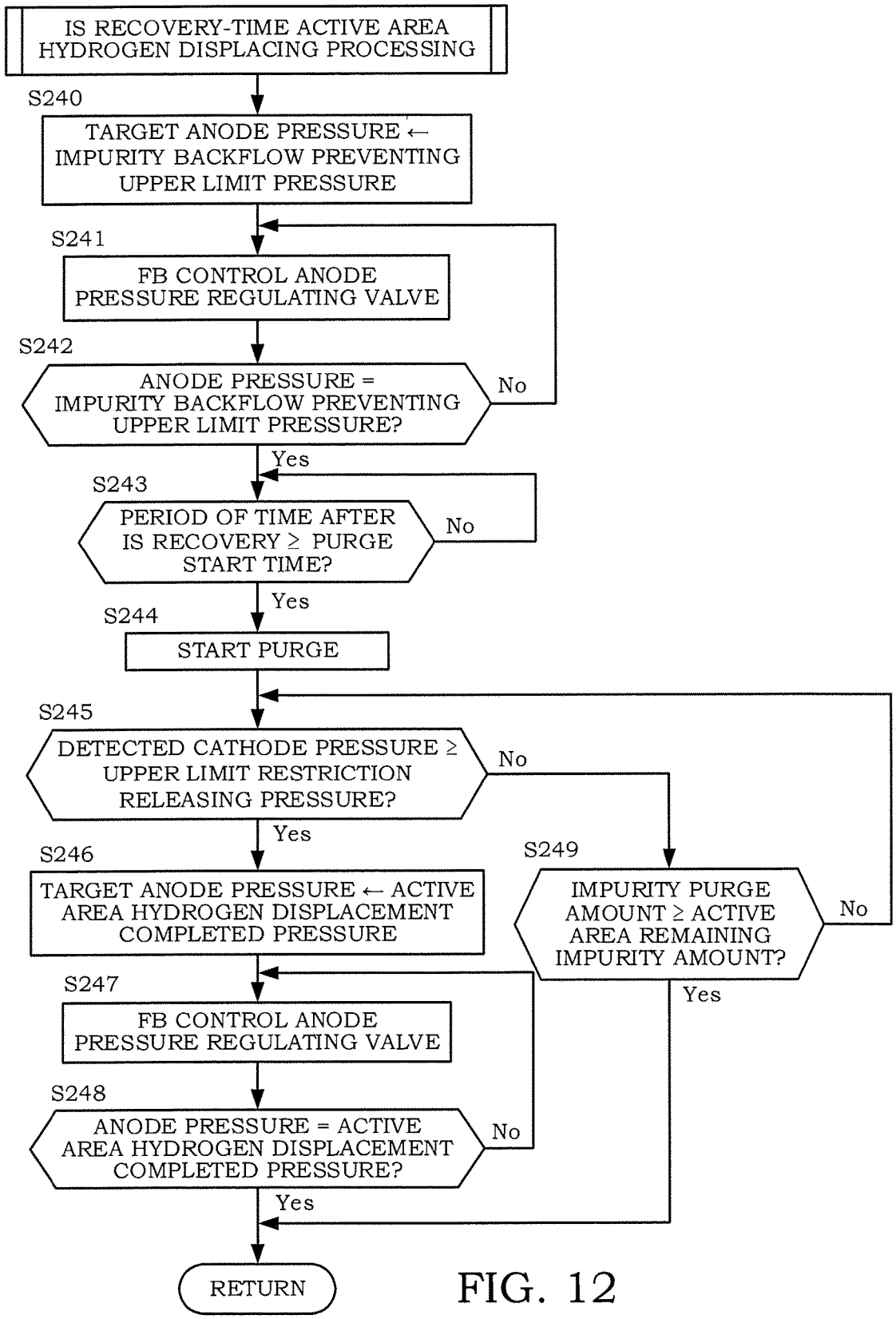
FIG. 12 is a flowchart for explaining the content of IS recovery-time active area hydrogen displacing processing.

FIG. 12 is a flowchart for explaining the content of IS recovery-time active area hydrogen displacing processing.

At Step S240, the controller 6 sets up the target anode pressure to the predetermined impurity backflow preventing upper limit pressure obtained by adding the allowable inter-membrane differential pressure to the atmosphere pressure. In this way, the anode pressure is controlled so as to be raised up to a pressure that can keep the allowable inter-membrane differential pressure on the basis of the atmosphere pressure during the beginning of the IS recovery. In this regard, the atmosphere pressure mentioned herein includes a value obtained by adding a sensor error and the like to the atmosphere pressure in view of a margin (for example, 20 [kPa]) (a predetermined pressure corresponding to the atmosphere pressure), and the like. Further, the atmosphere pressure itself varies due to a destination of a vehicle or the like on which the fuel cell system 100 is mounted (for example, a highland and the like). Although it is merely a reference value, the atmosphere pressure fluctuates in a range from 64.2 [kPa a] to 105 [kPa a].

Therefore, the cathode pressure is at least the atmosphere pressure or higher. Even though the cathode pressure fluctuates, the inter-membrane differential pressure can be kept to the allowable inter-membrane differential pressure or lower by controlling the anode pressure to the impurity backflow preventing upper limit pressure. In other words, by restricting a rise in the anode pressure up to the impurity backflow preventing upper limit pressure, there is no need to lower the anode pressure in order for the inter-membrane differential pressure to become the allowable inter-membrane differential pressure or lower even though the cathode pressure is lowered. For that reason, it is possible to prevent the impurity from flowing backward from the buffer tank 36 side to the active area of the anode gas flow passages 121. Therefore, it is possible to prevent starvation from occurring.

At Step S241, the controller 6 carries out the feedback control for the anode pressure regulating valve 33 so that the detected anode pressure becomes the impurity backflow preventing upper limit pressure. As a result of this feedback control, the anode pressure regulating valve 33 is opened to a desired opening degree, and the anode gas is supplied from the high-pressure tank 31 to the fuel cell stack 1. The anode pressure is thus kept to the impurity backflow preventing upper limit pressure.

At Step S242, the controller 6 determines whether the anode pressure is kept to the impurity backflow preventing upper limit pressure or not. In a case where the anode pressure is kept to the impurity backflow preventing upper limit pressure, the controller 6 carries out a process at Step S243. Otherwise, the controller returns to the process at Step S241.

At Step S243, the controller 6 determines whether a period of time after recovery from IS (hereinafter, referred to as a "period of time after IS recovery") becomes the purge start time or not. In a case where the period of time after IS recovery is the purge start time or more, the controller 6 carries out a process at Step S244. Otherwise, the controller 6 repeats the present processing until it becomes the purge start time.

At Step S244, the controller 6 opens the purge valve 38 to start the purge.

At Step S245, the controller 6 determines whether upper limit restriction of the anode pressure to the impurity backflow preventing upper limit pressure is to be released or not. More specifically, the controller 6 determines whether or not the detected cathode pressure reaches a predetermined upper limit restriction releasing pressure or higher. In a case where the detected cathode pressure becomes the upper limit restriction releasing pressure, the controller 6 carries out a process at Step S246. In a case where the detected cathode pressure is lower than the upper limit restriction releasing pressure, the controller 6 carries out a process at Step S249.

In this regard, the upper limit restriction releasing pressure is obtained by subtracting the allowable inter-membrane differential pressure from a predetermined active area hydrogen displacement completed pressure. Here, the active area hydrogen displacement completed pressure is a lower limit value of the anode pressure by which all the impurity can be forced out from the active area when the whole active area of the anode gas flow passages 121 is fulfilled with the impurity, and is a value obtained in advance by an experiment or the like. In the present embodiment, the active area hydrogen displacement completed pressure is set up to a value higher than the atmosphere pressure by 150 [kPa]. In this regard, a value of the active area hydrogen displacement completed pressure is merely a reference value. Thus, at Step S245, when a value obtained by adding the allowable inter-membrane differential pressure to the detected cathode pressure becomes the active area hydrogen displacement completed pressure or higher, upper limit restriction of the anode pressure, which is restricted up to the impurity backflow preventing upper limit pressure, is released in order to raise the anode pressure to the active area hydrogen displacement completed pressure to terminate the hydrogen displacement in the active area.

At Step S246, the controller 6 sets up the target anode pressure, which is set up to the impurity backflow preventing upper limit pressure, to the active area hydrogen displacement completed pressure.

At Step S247, the controller 6 carries out the feedback control for the anode pressure regulating valve 33 so that the anode pressure, which was controlled to the impurity backflow preventing upper limit pressure, is raised to the active area hydrogen displacement completed pressure. As a result of this feedback control, the anode pressure regulating valve 33 is opened to a desired opening degree to supply the anode gas from the high-pressure tank 31 to the fuel cell stack 1, whereby the anode pressure is raised to the active area hydrogen displacement completed pressure.

At Step S248, the controller 6 determines whether the anode pressure is raised to the active area hydrogen displacement completed pressure or not. In a case where the anode pressure is raised to the active area hydrogen displacement completed pressure, the controller 6 terminates the processing this time, and shifts to the IS recovery-time buffer tank hydrogen displacing processing. On the other hand, in a case where the anode pressure is not raised to the active area hydrogen displacement completed pressure, the controller 6 returns to the process at Step S247.

At Step S249, the controller 6 determine whether the impurity, which cannot be forced out from the active area of the anode gas flow passages 121 and remains in the active area when the anode pressure is raised to the impurity backflow preventing upper limit pressure, can be discharged by the purge or not, that is, whether the active area of the anode gas flow passages 121 can completely be displaced by the anode gas by means of the purge or not.

Here, when the normal pulsating operation is carried out, the purge flow rate is basically adjusted so that all of the impurity (mainly, nitrogen) that penetrates from the cathode gas flow passages 131 to the anode gas flow passages 121 is discharged. For that reason, in the present embodiment, the impurity amount in the anode gas flow passages 121 is assumed to be zero immediately after idle stop, and the impurity amount that penetrates the anode gas flow passages 121 in accordance with a time of the idle stop (hereinafter, referred to as a "penetrated impurity amount") is calculated. Since the penetrated impurity amount fluctuates in accordance with the idle stop time, the stack temperature and the like, it may be calculated by preparing a map or the like based on these parameters in advance by means of an experiment or the like. Then, an impurity concentration within the anode system is calculated on the basis of this penetrated impurity amount.

Further, a volume of a portion of the anode gas flow passages 121 in which the impurity remains (hereinafter, referred to as an "active area impurity remained volume") when the anode pressure is raised to the impurity backflow preventing upper limit pressure is obtained in advance by an experiment or the like, an impurity amount remaining in the active area (hereinafter, referred to as an "active area remaining impurity amount") is calculated by multiplying this active area impurity remained volume by the impurity concentration.

The controller 6 determines that the active area of the anode gas flow passages 121 can completely be displaced by the anode gas by means of the purge when a value obtained by multiplying the impurity concentration by the purge amount (hereinafter, referred to as a "impurity purge amount") becomes this active area remaining impurity amount or more; terminates the processing this time; and shifts to the IS recovery-time buffer tank hydrogen displacing processing. On the other hand, when the impurity purge amount is less than the active area remaining impurity amount, the controller 6 returns to the process at Step S245.

Figure 13:
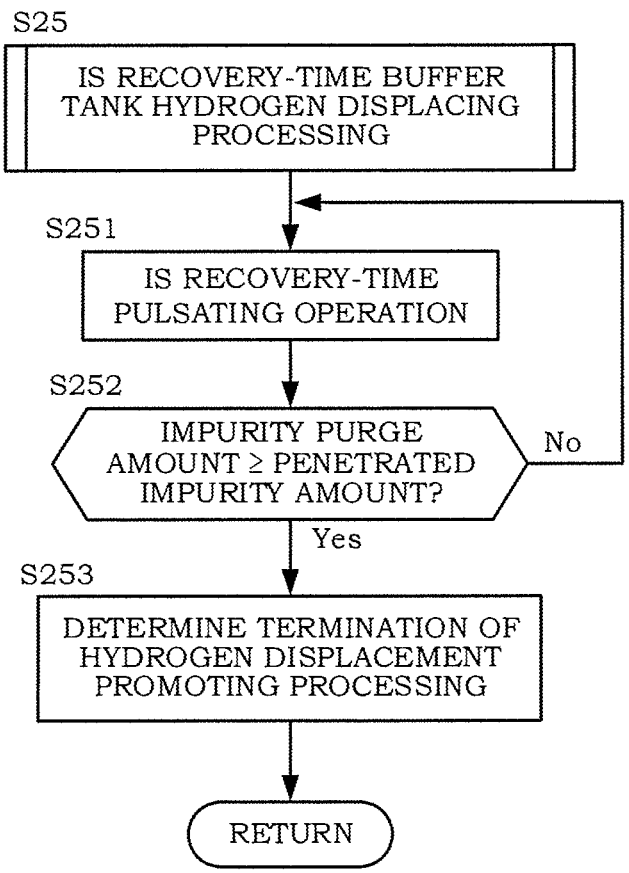
FIG. 13 is a flowchart for explaining IS recovery-time buffer tank hydrogen displacing processing.

FIG. 13 is a flowchart for explaining IS recovery-time buffer tank hydrogen displacing processing.

At Step S251, the controller 6 carries out the IS recovery-time pulsating operation. In this regard, the purge is continuously carried out from the IS recovery-time active area hydrogen displacing processing. The content of the IS recovery-time pulsating operation will be described later with reference to FIG. 14.

At Step S252, the controller 6 determines whether the inside of the buffer tank 36 can be displaced by the anode gas by means of the purge or not. More specifically, the controller 6 determines that the inside of the buffer tank 36 can be displaced by the anode gas when the impurity purge amount becomes the penetrated impurity amount or more. In a case where it is determined that the inside of the buffer tank 36 can be displaced by the anode gas, the controller 6 carries out a process at Step S251. Otherwise, the controller 6 continuously carries out the purge while carrying out the IS recovery-time pulsating operation.

At Step S253, the controller 6 determines that the hydrogen displacement promoting processing is terminated.

Figure 14:
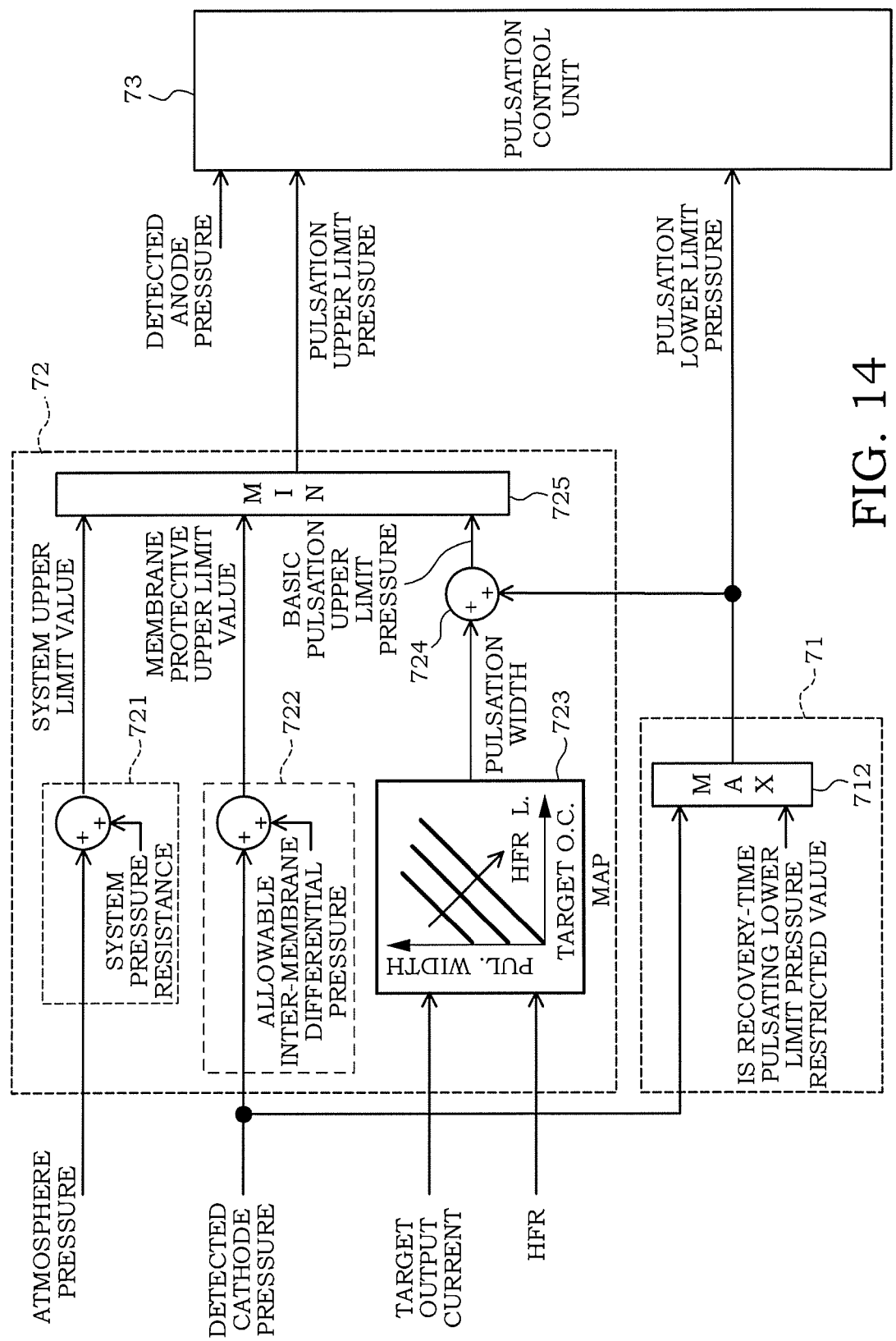
FIG. 14 is a block diagram for explaining the content of an IS recovery-time pulsating operation.

FIG. 14 is a block diagram for explaining the content of the IS recovery-time pulsating operation. In this regard, portions serving as the similar functions in the normal pulsating operation process described above are denoted by the same reference numerals, and the overlapping explanation will be omitted appropriately.

As shown in FIG. 14, in the IS recovery-time pulsating operation, the detected cathode pressure and a predetermined IS recovery-time pulsating lower limit pressure restricted value are inputted to the pulsation lower limit pressure setting unit 712, and larger one of these two inputted values is set up as the pulsation lower limit pressure.

The IS recovery-time pulsating lower limit pressure restricted value is the lower limit value of the anode pressure at which starvation does not occur even in a case where the anode pressure is lowered from the system upper limit value, and is a predetermined value obtained in advance by an experiment or the like. In the present embodiment, it is set up to a pressure slightly lower than the impurity backflow preventing upper limit pressure.

Figure 15:
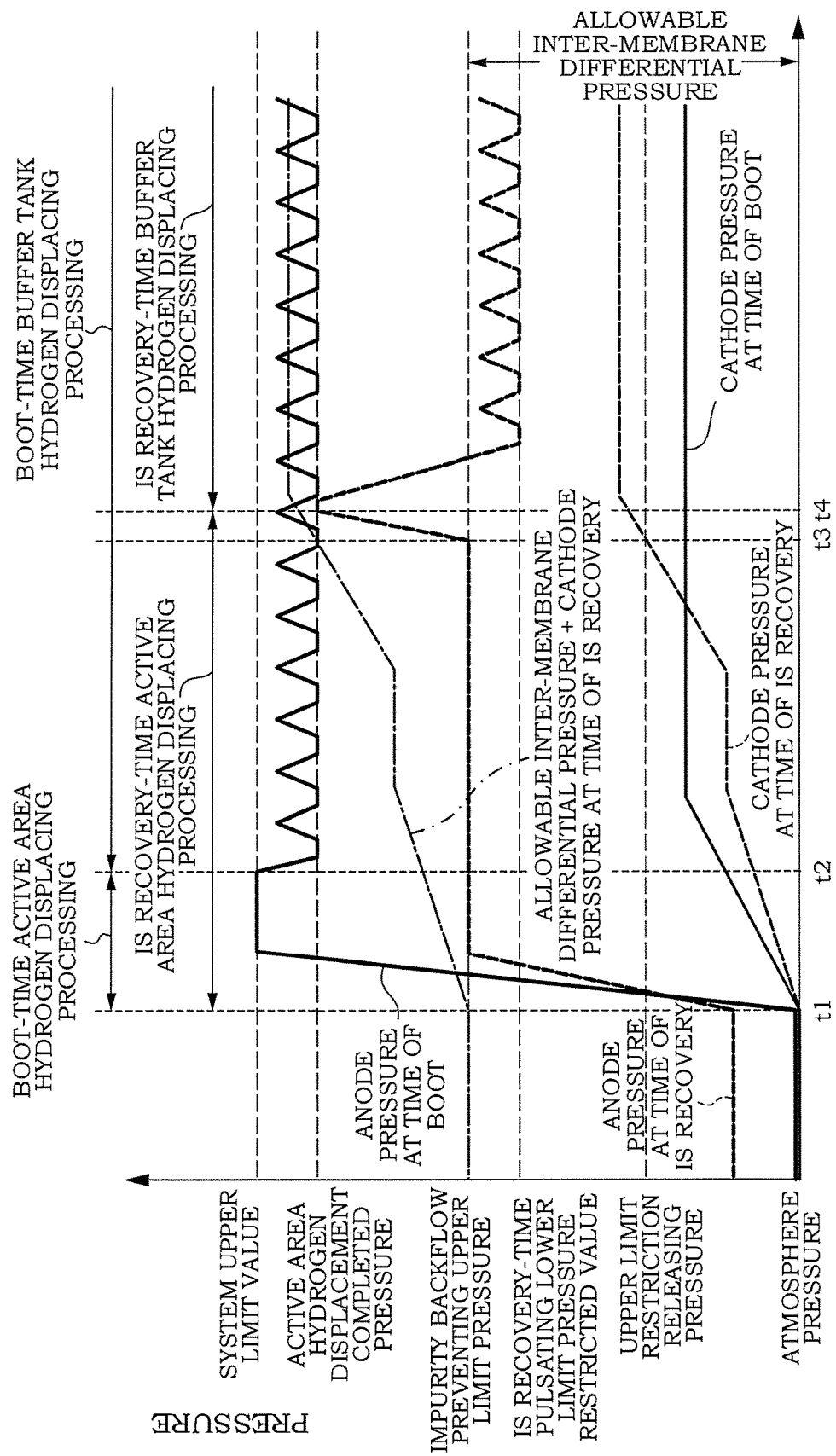
FIG. 15 is a time chart for explaining an operation of the anode pressure control according to one embodiment of the present invention.

FIG. 15 is a time chart for explaining an operation of the anode pressure control according to the present embodiment.

The hydrogen displacing processing at the time of the boot will first be described.

At a time t1, when the fuel cell system 100 is booted, the boot-time active area hydrogen displacing processing is started, whereby the anode pressure is raised to the system upper limit value. The system upper limit value is a pressure higher than the active area hydrogen displacement completed pressure described above. For this reason, by raising the anode pressure to the system upper limit value to quickly force out the impurity accumulated in the anode gas flow passages 121 during stop of the fuel cell system 100 to the buffer tank 36, it is possible to displace the inside of the anode gas flow passages 121 facing the active area by hydrogen.

When the anode pressure is raised to the system upper limit value and hydrogen displacement in the anode gas flow passages 121 facing the active area is completed, the boot-time buffer tank hydrogen displacing processing is started. Then, when the period of time after the boot becomes the purge start time at a time t2, the purge valve 38 is opened to start purge, and the boot-time pulsating operation is carried out.

In the boot-time pulsating operation, the lower limit value of the anode pressure during the pulsating operation is set up to the boot-time lower limit pressure (in the present embodiment, the active area hydrogen displacement completed pressure), which is higher than the normal pulsating operation. The pulsating operation is then carried out at a state that the pulsation lower limit pressure is kept to as high as possible. As described above, the higher the anode pressure becomes, the more the purge flow rate increases because the differential pressure with the atmosphere pressure becomes higher. For that reason, by carrying out the pulsating operation at the state that the pulsation lower limit pressure is kept to as high as possible, the impurity flows backward to the fuel cell stack 1 side from the buffer tank 36 when the anode pressure is lowered from the pulsation upper limit pressure toward the pulsation lower limit pressure. This makes it possible to increase the impurity amount discharged to the purge passage 37. Therefore, the impurity in the buffer tank 36 can effectively be discharged to the outside from the system, and this makes it possible to promote hydrogen displacement in the buffer tank 36.

Then, when the purge amount becomes the boot-time impurity amount or more, it is shifted from the boot-time pulsating operation to the normal pulsating operation, and a pulsating operation in which the cathode pressure is basically set up to the pulsation lower limit pressure is carried out.

Next, hydrogen displacing processing at the time of recovery from the IS will be described.

At the time t1, when the IS recovery is made, the IS recovery-time active area hydrogen displacing processing is started. The anode pressure is raised to the impurity backflow preventing upper limit pressure, and the anode pressure is kept to the impurity backflow preventing upper limit pressure. Thus, at the time of the IS recovery, the anode pressure is controlled so as to be raised to no farther than a pressure that can keep the allowable inter-membrane differential pressure on the basis of the atmosphere pressure.

This makes it possible to keep the inter-membrane differential pressure to the allowable inter-membrane differential pressure or lower even though the cathode pressure fluctuates or varies, because the cathode pressure is at least the atmosphere pressure or higher. In other words, by restricting the rise in the anode pressure up to the impurity backflow preventing upper limit pressure, there is no need to lower the anode pressure in order for the inter-membrane differential pressure to become the allowable inter-membrane differential pressure or lower even though the cathode pressure is lowered. For that reason, it is possible to prevent the impurity from flowing backward to the active area of the anode gas flow passages 121 from the buffer tank 36 side. Therefore, it is possible to prevent starvation from occurring.

On the other hand, the impurity backflow preventing upper limit pressure is lower than the active area hydrogen displacement completed pressure. For that reason, it is in a state where the impurity that penetrates the anode side during the IS remains in the active area at the time of the IS recovery. For that reason, when the period of time after the IS recovery becomes the purge start time at the time t2, the purge valve 38 is opened to start purge in order to discharge the active area remaining impurity amount from the active area.

In this time chart, before the active area remaining impurity amount is discharged from the active area, for example, the accelerator operating amount is increased to increase a load of the fuel cell stack 1, whereby the cathode pressure is increased, and the detected cathode pressure becomes the upper limit restriction releasing pressure or higher at a time t3. For that reason, the anode pressure is raised to the active area hydrogen displacement completed pressure. As a result, the hydrogen displacement in the active area is completed, and the IS recovery-time buffer tank hydrogen displacing processing is started to carry out the IS recovery-time pulsating operation after a time t4.

In the IS recovery-time pulsating operation, the lower limit value of the anode pressure when to carry out the pulsating operation is set up to the IS recovery-time pulsating lower limit pressure restricted value, whereby starvation is surely prevented from occurring even though the anode pressure is lowered from the active area hydrogen displacement completed pressure to the IS recovery-time pulsating lower limit pressure restricted value. In a case where the impurity purge amount becomes the penetrated impurity amount or more during this IS recovery-time pulsating operation, it is shifted from the IS recovery-time pulsating operation to the normal pulsating operation, and a pulsating operation in which the cathode pressure is basically set up to the pulsation lower limit pressure is carried out.

The fuel cell system 100 according to the present embodiment described above is a fuel cell system with an idle stop function in which the electric power generation by the fuel cell stack 1 can be stopped temporarily. This fuel cell system 100 includes the controller 6 configured to include: a cathode pressure control unit configured to control a pressure of the cathode gas to be supplied to the fuel cell stack 1 on the basis of the target output current (load) of the fuel cell stack 1; and an anode pressure control unit configured to control a pressure of the anode gas to be supplied to the fuel cell stack 1 to become the pressure of the supplied cathode gas or higher so that a differential pressure between the pressure of the anode gas and the pressure of the cathode gas becomes the allowable inter-membrane differential pressure (that is, a predetermined differential pressure) or lower.

Further, the anode pressure control unit controls, at the time of IS recovery, the pressure of the anode gas to be supplied to the fuel cell stack 1 to the impurity backflow preventing upper limit pressure (a recovery-time pressure) obtained by adding the allowable inter-membrane differential pressure to a predetermined pressure equivalent to the atmosphere pressure.

For that reason, even though the target output current of the fuel cell stack 1 is lowered to lower the pressure of the cathode gas at the time of the IS recovery, the pressure of the anode gas is controlled to the impurity backflow preventing upper limit pressure, whereby the pressure of the anode gas is not lowered. Therefore, the impurity temporarily discharged from the fuel cell stack 1 does not flow backward thereto, and this makes it possible to suppress occurrence of starvation.

Further, the pressure of the cathode gas to be supplied to the fuel cell stack 1 on the basis of the target output current of the fuel cell stack 1 is at least higher than the atmosphere pressure. For this reason, by controlling the pressure of the anode gas to the impurity backflow preventing upper limit pressure at the time of the IS recovery, the inter-membrane differential pressure never exceeds the allowable inter-membrane differential pressure. Therefore, it is also possible to suppress the mechanical strength of the electrolyte membrane 111 from being deteriorated.

Further, the anode pressure control unit of the fuel cell system 100 according to the present embodiment raises the pressure of the anode gas, which is controlled to the impurity backflow preventing upper limit pressure (the recovery-time pressure), to the active area hydrogen displacement completed pressure (a displacement pressure), at which the impurity remaining in the fuel cell stack 1 can be discharged from the inside of the fuel cell stack 1 and can be displaced by the anode gas, when the pressure of the cathode gas is raised to the upper limit restriction releasing pressure (releasing pressure). Here, the upper limit restriction releasing pressure (releasing pressure) is a pressure obtained by subtracting the allowable inter-membrane differential pressure from the active area hydrogen displacement completed pressure (the displacement pressure).

At a stage in which the inter-membrane differential pressure can be suppressed to the allowable inter-membrane differential pressure or lower in this manner even though the pressure of the anode gas is raised to the active area hydrogen displacement completed pressure, the pressure of the anode gas is raised from the impurity backflow preventing upper limit pressure to the active area hydrogen displacement completed pressure. This makes it possible to early displace the anode gas flow passages 121 facing the active area by the anode gas after recovery from the IS.

Further, the fuel cell system 100 according to the present embodiment includes: the buffer tank 36 (a buffer unit) configured to store the anode-off gas containing the impurity discharged from the fuel cell stack 1; the purge valve 38 through which the anode-off gas stored in the buffer tank 36 is purged to the outside of the fuel cell system 100; and the controller 6 configured to further include a purge control unit configured to cause the purge valve 38 to open after the recovery from the IS to carry out the purge.

Then, the anode pressure control unit pulsates the pressure of the anode gas together with execution of the purge after the pressure of the anode gas is raised to the active area hydrogen displacement completed pressure. Therefore, it is possible to purge the impurity discharged from the fuel cell stack 1 and flowing into the buffer tank 36 to the outside of the fuel cell system 100.

Further, the anode pressure control unit of the fuel cell system 100 according to the present embodiment purges, in a case where the pressure of the anode gas is controlled to the impurity backflow preventing upper limit pressure (the recovery-time pressure), the impurity, which was discharged from the inside of the fuel cell stack 1 and flows into the buffer tank 36, to the outside of the fuel cell system 100 by pulsating the pressure of the anode gas together with execution of the purge even though the impurity remaining in the fuel cell stack 1 can be discharged from the inside of the fuel cell stack 1 by means of the execution of the purge.

For that reason, even though the pressure of the cathode gas is not raised to the upper limit restriction releasing pressure, the impurity in the buffer tank 36 can early be purged to the outside of the fuel cell system 100 at a stage that hydrogen displacement of the active area is completed.

Further, the anode pressure control unit of the fuel cell system 100 according to the present embodiment allows the differential pressure between the pressure of the anode gas and the pressure of the cathode gas to become larger than the allowable inter-membrane differential pressure at the time of boot of the fuel cell system 100 to raise the pressure of the anode gas to be supplied to the fuel cell stack 1 to the active area hydrogen displacement completed pressure (the displacement pressure) or higher.

This makes it possible to early displace the anode gas flow passages 121 facing the active area by the anode gas after the boot of the fuel cell system 100.

As described above, although the embodiments of the present invention have been explained, the above embodiments merely illustrate a part of examples of application of the present invention, and it does not mean that a technical scope of the present invention is limited to a specific configuration of each of the embodiments described above.

In the embodiment described above, the anode pressure control unit controls the pressure of the anode gas to be supplied to the fuel cell stack 1 to the impurity backflow preventing upper limit pressure at the time of the IS recovery. However, for example, at the time of the IS recovery, the pressure of the anode gas to be supplied to the fuel cell may be controlled to the impurity backflow preventing upper limit pressure or lower, whereby reduction of the pressure of the anode gas may be prohibited or a pressure reduction width may be regulated.

Even though it is done in this manner, the pressure of the anode gas is controlled so as to be the impurity backflow preventing upper limit pressure or lower. For this reason, the inter-membrane differential pressure never exceeds the allowable inter-membrane differential pressure. Further, by prohibiting reduction of the pressure of the anode gas, the pressure of the anode gas is not lowered even when the pressure of the cathode gas is lowered. Thus, the impurity temporarily discharged from the fuel cell stack 1 cannot flow backward thereto. Further, by regulating a reduction width of the pressure of the anode gas, it is possible to suppress lowering of the pressure of the anode gas to a certain range when the pressure of the cathode gas is lowered. For this reason, it is possible to suppress the impurity temporarily discharged from the fuel cell stack 1 from flowing backward thereto. Therefore, it is possible to suppress starvation from occurring in any of the cases.

Further, in the embodiment described above, the buffer tank 36 as a space in which the anode-off gas is stored has been provided. However, an internal manifold of the fuel cell stack 1 may be used as a space in place of the buffer tank 36 without providing the buffer tank 36, for example. The internal manifold mentioned herein is a space inside the fuel cell stack 1 in which the anode-off gas that finishes flowing in the anode gas flow passages 121 is collected, and the anode-off gas is discharged to the anode gas discharge passage 35 via the manifold.

Further, in the embodiment described above, at the time of the IS recovery, the IS recovery-time pulsating lower limit pressure restricted value is set up as the pulsation lower limit pressure after the anode pressure is raised to the active area hydrogen displacement completed pressure, and the pulsating operation based on the pulsation lower limit pressure is carried out. However, it is not limited to this. For example, in order to promote the buffer tank hydrogen displacing processing, a pulsating operation in which the active area hydrogen displacement completed pressure is set up as the pulsation upper limit pressure and a value obtained by subtracting the pulsation width therefrom is set up as the pulsation lower limit pressure may be carried out.

The present application claims priority based on Japanese Patent Application No. 2013-236291, filed with the Japan Patent Office on Nov. 14, 2013, the entire content of which is expressly incorporated herein by reference.

The invention claimed is:

1. A fuel cell system with an idle stop function in which electric power generation by a fuel cell can be stopped temporarily, the fuel cell system comprising:
    a cathode pressure control unit configured to control a pressure of a cathode gas to be supplied to the fuel cell on the basis of a load of the fuel cell; and
    an anode pressure control unit configured to control a pressure of an anode gas to be supplied to the fuel cell to become higher than the pressure of the cathode gas so that a differential pressure between the pressure of the anode gas and the pressure of the cathode gas becomes a predetermined differential pressure or lower,
    wherein the anode pressure control unit controls, at a time of recovery from idle stop, the pressure of the anode gas to be supplied to the fuel cell to a recovery-time pressure, the recovery-time pressure being obtained by adding the predetermined differential pressure to a predetermined pressure corresponding to an atmosphere pressure.

2. The fuel cell system according to claim 1,
    wherein the anode pressure control unit raises the pressure of the anode gas, which is controlled to the recovery-time pressure, to a predetermined displacement pressure, at which an impurity remaining in the fuel cell can be discharged from the fuel cell and can be displaced by the anode gas, when the pressure of the cathode gas is raised to a predetermined releasing pressure.

3. The fuel cell system according to claim 2, further comprising:
a buffer unit configured to store an anode-off gas discharged from the fuel cell, the anode-off gas containing the impurity;
a purge valve through which the anode-off gas stored in the buffer unit is purged to an outside of the fuel cell system; and
a purge control unit configured to cause the purge valve to open to carry out purge after recovery from the idle stop,
wherein the anode pressure control unit purges the impurity, which was discharged from an inside of the fuel cell and flows into the buffer unit, to an outside of the fuel cell system by pulsating the pressure of the anode gas together with execution of the purge after the pressure of the anode gas is raised to the displacement pressure.

4. The fuel cell system according to claim 3,
wherein in a case where the pressure of the anode gas is controlled to the recovery-time pressure, the anode pressure control unit purges the impurity, which was discharged from the inside of the fuel cell and flows into the buffer unit, to the outside of the fuel cell system by pulsating the pressure of the anode gas together with the execution of the purge even though the impurity remaining in the fuel cell can be discharged from the inside of the fuel cell only by the execution of the purge.

5. The fuel cell system according to claim 1,
wherein the anode pressure control unit allows a differential pressure between the pressure of the anode gas and the pressure of the cathode gas to become larger than the predetermined differential pressure at a time of boot of the fuel cell system to raise the pressure of the anode gas to be supplied to the fuel cell to the displacement pressure or higher.

6. The fuel cell system according to claim 2,
wherein the releasing pressure is a pressure obtained by subtracting the predetermined differential pressure from the displacement pressure.

7. The fuel cell system according to claim 1,
wherein the predetermined differential pressure is the maximum value of a differential pressure between an anode side and a cathode side in the fuel cell, the differential pressure being allowed in order to ensure durability of an electrolyte membrane of the fuel cell.

8. A fuel cell system with an idle stop function in which electric power generation by a fuel cell can be stopped temporarily, the fuel cell system comprising:
a cathode pressure control unit configured to control a pressure of a cathode gas to be supplied to the fuel cell on the basis of a load of the fuel cell; and
an anode pressure control unit configured to control a pressure of an anode gas to be supplied to the fuel cell to become higher than the pressure of the cathode gas so that a differential pressure between the pressure of the anode gas and the pressure of the cathode gas becomes a predetermined differential pressure or lower,
wherein the anode pressure control unit controls the pressure of the anode gas to be supplied to the fuel cell to be a recovery-time pressure or lower at a time of recovery from idle stop, and prohibits reduction of the pressure of the anode gas or regulates a reduction width, the recovery-time pressure being obtained by adding the predetermined differential pressure to a predetermined pressure equivalent to an atmosphere pressure.

9. A fuel cell system with an idle stop function in which electric power generation by a fuel cell can be stopped temporarily,
wherein at a time of recovery from the idle stop, a pressure of an anode gas to be supplied to the fuel cell is controlled to a pressure, by which protection of an electrolyte membrane of the fuel cell can be attained, on the basis of a predetermined pressure equivalent to an atmosphere pressure.

\* \* \* \* \*